US008121941B2

(12) United States Patent
Matthews et al.

(10) Patent No.: US 8,121,941 B2
(45) Date of Patent: Feb. 21, 2012

(54) SYSTEM AND METHOD FOR AUTOMATIC RECONCILIATION OF TRANSACTION ACCOUNT SPEND

(75) Inventors: Bradley Owen Matthews, Oak Hill, VA (US); Fred Bishop, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 281 days.

(21) Appl. No.: 11/611,034

(22) Filed: Dec. 14, 2006

(65) Prior Publication Data

US 2007/0083444 A1 Apr. 12, 2007

Related U.S. Application Data

(63) Continuation-in-part of application No. 09/800,461, filed on Mar. 7, 2001.

(60) Provisional application No. 60/187,620, filed on Mar. 7, 2000, provisional application No. 60/200,625, filed on Apr. 28, 2000, provisional application No. 60/213,323, filed on Jun. 22, 2000.

(51) Int. Cl.
 *G06Q 40/00* (2006.01)
(52) U.S. Cl. ....................................................... 705/39
(58) Field of Classification Search ................... 705/39
 See application file for complete search history.

(56) References Cited

U.S. PATENT DOCUMENTS

| 4,450,535 | A | 5/1984 | dePommery et al. |
| 5,016,274 | A | 5/1991 | Micali et al. |
| 5,023,908 | A | 6/1991 | Weiss |
| 5,034,597 | A | 7/1991 | Atsumi et al. |
| 5,350,906 | A | 9/1994 | Brody et al. |
| 5,453,601 | A | 9/1995 | Rosen |
| 5,461,217 | A | 10/1995 | Claus |
| 5,500,513 | A | 3/1996 | Langhans et al. |
| 5,504,808 | A | 4/1996 | Hamrick, Jr. |
| 5,577,120 | A | 11/1996 | Penzias |

(Continued)

FOREIGN PATENT DOCUMENTS

EP 1115095 7/2001

(Continued)

OTHER PUBLICATIONS

Green, Thomas C., "American Express offers temporary CC numbers for the Web", Sep. 9, 2000, The Register, www.theregister.c.uk/c.

(Continued)

*Primary Examiner* — Lindsay M. Maguire

(74) *Attorney, Agent, or Firm* — Snell & Wilmer L.L.P.

(57) ABSTRACT

A system and method for facilitating automatic reconciliation of transaction card transactions is disclosed, wherein a user may request single-use account codes via the Internet. The system comprises various hardware and software systems to enable a card member, program administrator, or any other designated third-party to request one or more single-use account codes. The requestor may further assign a descriptor for each of the one or more account codes. After receiving a requested account code, the requester may communicate the account code to a merchant to facilitate a purchase transaction. The system retrieves a list of transactions from the card issuer at regular intervals, matches the account codes in the list to an account code and associated descriptor, and records the reconciled transaction within a database.

17 Claims, 20 Drawing Sheets

U.S. PATENT DOCUMENTS

| | | |
|---|---|---|
| 5,594,227 A | 1/1997 | Deo |
| 5,614,703 A | 3/1997 | Martin et al. |
| 5,621,787 A | 4/1997 | McKoy et al. |
| 5,641,050 A | 6/1997 | Smith et al. |
| 5,689,100 A | 11/1997 | Carrithers et al. |
| 5,715,399 A | 2/1998 | Bezos |
| 5,721,781 A | 2/1998 | Deo et al. |
| 5,724,424 A | 3/1998 | Gifford |
| 5,734,838 A | 3/1998 | Robinson et al. |
| 5,742,756 A | 4/1998 | Dillaway et al. |
| 5,742,845 A | 4/1998 | Wagner |
| 5,745,555 A | 4/1998 | Mark |
| 5,768,385 A | 6/1998 | Simon |
| 5,770,843 A | 6/1998 | Rose et al. |
| 5,778,069 A | 7/1998 | Thomlinson et al. |
| 5,814,796 A | 9/1998 | Benson et al. |
| 5,826,241 A | 10/1998 | Stein et al. |
| 5,826,242 A | 10/1998 | Montulli |
| 5,852,812 A | 12/1998 | Reeder |
| 5,862,325 A | 1/1999 | Reed et al. |
| 5,864,830 A | 1/1999 | Armetta et al. |
| 5,878,138 A | 3/1999 | Yacobi |
| 5,878,141 A | 3/1999 | Daly et al. |
| 5,883,810 A | 3/1999 | Franklin et al. |
| 5,884,280 A | 3/1999 | Yoshioka et al. |
| 5,892,827 A | 4/1999 | Beach et al. |
| 5,897,622 A | 4/1999 | Blinn et al. |
| 5,898,838 A | 4/1999 | Wagner |
| 5,903,830 A | 5/1999 | Joao et al. |
| 5,903,875 A | 5/1999 | Kohara |
| 5,903,880 A | 5/1999 | Blffar |
| 5,905,908 A | 5/1999 | Wagner |
| 5,909,492 A | 6/1999 | Payne et al. |
| 5,913,203 A | 6/1999 | Wong et al. |
| 5,914,472 A | 6/1999 | Foladare et al. |
| 5,915,023 A | 6/1999 | Bernstein |
| 5,918,216 A | 6/1999 | Mikosovsky et al. |
| 5,923,734 A | 7/1999 | Taskett |
| 5,930,767 A | 7/1999 | Reber et al. |
| 5,930,777 A | 7/1999 | Barber |
| 5,949,044 A | 9/1999 | Walker et al. |
| 5,949,876 A | 9/1999 | Ginter et al. |
| 5,953,710 A | 9/1999 | Fleming |
| 5,956,699 A | 9/1999 | Wong et al. |
| 5,958,004 A | 9/1999 | Helland et al. |
| 5,960,411 A | 9/1999 | Hartman et al. |
| 5,963,915 A | 10/1999 | Kirsch |
| 5,966,697 A | 10/1999 | Fergerson et al. |
| 5,970,471 A | 10/1999 | Hill |
| 5,970,472 A | 10/1999 | Allsop et al. |
| 5,970,473 A | 10/1999 | Gerszberg et al. |
| 5,970,475 A | 10/1999 | Barnes et al. |
| 5,983,207 A | 11/1999 | Turk et al. |
| 5,984,180 A | 11/1999 | Albrecht |
| 5,991,413 A | 11/1999 | Arditti et al. |
| 5,991,748 A | 11/1999 | Taskett |
| 5,999,914 A | 12/1999 | Blinn et al. |
| 6,000,832 A | 12/1999 | Franklin et al. |
| 6,002,767 A | 12/1999 | Kramer |
| 6,009,412 A | 12/1999 | Storey |
| 6,012,143 A | 1/2000 | Tanaka |
| 6,014,634 A | 1/2000 | Scroggie et al. |
| 6,014,635 A | 1/2000 | Harris et al. |
| 6,014,636 A | 1/2000 | Reeder |
| 6,014,646 A | 1/2000 | Vallee et al. |
| 6,014,648 A | 1/2000 | Brennan |
| 6,014,650 A | 1/2000 | Zampese |
| 6,014,748 A | 1/2000 | Tushie et al. |
| 6,016,482 A | 1/2000 | Molinari et al. |
| 6,016,484 A | 1/2000 | Williams et al. |
| 6,018,718 A | 1/2000 | Walker et al. |
| 6,021,943 A | 2/2000 | Chastain |
| 6,023,510 A | 2/2000 | Epstein |
| 6,029,147 A | 2/2000 | Horadan et al. |
| 6,029,150 A | 2/2000 | Kravitz |
| 6,029,890 A | 2/2000 | Austin |
| 6,038,292 A | 3/2000 | Thomas |
| 6,038,551 A | 3/2000 | Barlow et al. |
| 6,041,308 A | 3/2000 | Walker et al. |
| 6,044,360 A | 3/2000 | Picciallo |
| 6,052,675 A | 4/2000 | Checchio |
| 6,058,418 A | 5/2000 | Kobata |
| 6,061,789 A | 5/2000 | Hauser et al. |
| 6,064,981 A | 5/2000 | Barni et al. |
| 6,065,675 A | 5/2000 | Teicher |
| 6,070,150 A | 5/2000 | Remington et al. |
| 6,070,154 A | 5/2000 | Tavor et al. |
| 6,076,078 A | 6/2000 | Camp et al. |
| 6,078,906 A | 6/2000 | Huberman |
| 6,078,908 A | 6/2000 | Schmitz |
| 6,081,790 A | 6/2000 | Rosen |
| 6,088,683 A | 7/2000 | Jalili |
| 6,088,717 A | 7/2000 | Reed et al. |
| 6,088,797 A | 7/2000 | Rosen |
| 6,092,198 A | 7/2000 | Lanzy et al. |
| 6,098,053 A | 8/2000 | Slater |
| 6,112,191 A | 8/2000 | Burke |
| 6,115,458 A | 9/2000 | Taskett |
| 6,122,625 A | 9/2000 | Rosen |
| 6,125,352 A | 9/2000 | Franklin et al. |
| 6,141,752 A | 10/2000 | Dancs et al. |
| 6,163,771 A | 12/2000 | Walker et al. |
| 6,173,269 B1 | 1/2001 | Solokl et al. |
| 6,182,895 B1 | 2/2001 | Albrecht |
| 6,189,787 B1 | 2/2001 | Dorf |
| 6,227,447 B1 | 5/2001 | Campisano |
| 6,267,292 B1 | 7/2001 | Walker et al. |
| 6,330,544 B1 | 12/2001 | Walker et al. |
| 6,336,095 B1 | 1/2002 | Rosen |
| 6,339,766 B1 | 1/2002 | Gephart |
| 6,405,182 B1 | 6/2002 | Cuervo |
| 6,473,500 B1 | 10/2002 | Risafi et al. |
| 6,526,130 B1 | 2/2003 | Paschini |
| 6,542,601 B1 | 4/2003 | Hernandez et al. |
| 6,581,827 B2 | 6/2003 | Welton |
| 6,609,654 B1 | 8/2003 | Anderson et al. |
| 6,636,833 B1 | 10/2003 | Flitcroft et al. |
| 6,705,519 B1 | 3/2004 | Goodwin, III |
| 6,834,270 B1 | 12/2004 | Pagani et al. |
| 6,901,387 B2 | 5/2005 | Wells et al. |
| 7,100,821 B2 | 9/2006 | Rasti |
| 7,136,835 B1 | 11/2006 | Flitcroft et al. |
| 2002/0046341 A1 | 4/2002 | Kazaks et al. |
| 2002/0159601 A1 | 10/2002 | Bushmitch et al. |
| 2002/0174016 A1 | 11/2002 | Cuervo |
| 2002/0184143 A1 | 12/2002 | Khater |
| 2003/0001005 A1 | 1/2003 | Risafi et al. |
| 2003/0004889 A1 | 1/2003 | Fiala et al. |
| 2003/0018567 A1 | 1/2003 | Flitcroft et al. |
| 2003/0028481 A1* | 2/2003 | Flitcroft et al. ............... 705/39 |
| 2003/0053609 A1 | 3/2003 | Risafi et al. |
| 2003/0069846 A1 | 4/2003 | Marcon |
| 2003/0078896 A1 | 4/2003 | Fox |
| 2003/0095646 A1 | 5/2003 | Paschini |
| 2003/0115126 A1* | 6/2003 | Pitroda ......................... 705/36 |
| 2003/0204456 A1* | 10/2003 | Engdahl et al. ............... 705/30 |
| 2004/0006539 A1 | 1/2004 | Royer et al. |
| 2004/0083184 A1 | 4/2004 | Tsuei et al. |
| 2004/0098312 A1* | 5/2004 | Glazer et al. ................. 705/26 |
| 2006/0151598 A1* | 7/2006 | Chen et al. ................... 235/380 |

FOREIGN PATENT DOCUMENTS

| | | |
|---|---|---|
| GB | 2361790 | 10/2001 |
| WO | WO 97/09688 | 3/1997 |
| WO | WO 99/49424 | 9/1999 |
| WO | WO 00/49586 | 8/2000 |

OTHER PUBLICATIONS

CNN.com; U.S. News, "American Express to offer disposable credit card numbers", Sep. 8, 2000, Associated Press, www.cnn.c.

American Express, "Private PaymentsSM ; A New Level of Security from American Express", American Express website, cards.

Martin, Zack; "One-Time Numbers Stop Web Hackers From Pilfering Data", Jan. 2001, Card Marketing, Thomson Financial, www.c rdf rum.c.

The Dollar Stretcher, "Disposable Credit Card Numbers", Jan. 2001, CardRatins.org, www.stretcher.c.

Gabber, et al, "Agora: a Minimal Distributed Protocol for Electronic Commerce," Nov. 18, 1996, USENIX Oakland, CA pp. 1, 8 and 9.

Lamond, "Credit Card Transactions Real World and Online" copyright 1996.

\* cited by examiner

```
ARZPP   PRIVATE PAYMENT INQUIRY                      S-TSC6-03 09/26/00
ACCT:   0000 000000 00000  AMT:
                                     MONTH:       YEAR:
                                     PLASTIC NO:

PRIVATE PAYMENT NO   EXP DT      CHG DT       CHARGE AMT  MAG SEQ NO CTR
0000 001111 11111   2000-09-30   09/09/2000      48.59               PP
MERCHANT A
0000 002222 22222   2000-09-30   09/09/2000      59.00               SC
MERCHANT B

END OF DETAIL
```

175 → (pointing to screen)

20 — ACCT line
15 — Private payment no rows
2 — Merchant rows

| ACCOUNT NUMBER | LOCKED | DESCRIPTOR |
|---|---|---|
| 378712345679123 | X | WS12345 |
| 378712345679124 | | |
| 378712345679125 | | |
| 378712345679126 | X | WS12346 |
| 378712345679127 | X | WS12347 |
| 378712345679128 | X | WS12348 |
| 378712345679129 | | |

SYSTEM AND METHOD FOR AUTOMATIC RECONCILIATION OF TRANSACTION ACCOUNT SPEND

REFERENCE TO RELATED APPLICATION

This application is a continuation-in-part of U.S. Ser. No. 09/800,461, filed Mar. 7, 2001 and entitled "System for Facilitating a Transaction", which itself claims priority to U.S. provisional applications: (1) Ser. No. 60/187,620, filed Mar. 7, 2000, (2) Ser. No. 60/200,625, filed Apr. 28, 2000, and (3) Ser. No. 60/213,323, filed Jun. 22, 2000.

FIELD OF THE INVENTION

The invention generally relates to the automated reconciliation of card member spend, and more particularly, to a system and method for providing single-use account codes each having a designation with a descriptor of a specific spend transaction.

BACKGROUND OF THE INVENTION

Corporations often empower employees to execute purchase transactions on behalf of the company in the course of day-to-day operations. Such purchases may include, for example, office supplies, client entertainment, travel expenses, and/or the like. It is generally accepted among businesses that the most convenient and safe manner for providing this empowerment is through opening a corporate transaction card account. Through a centralized corporate account, the employer may disperse any desired number of transaction cards to its workforce. However, tracking spending and reconciling accounting systems for a large number of corporate transaction cards is most often a time consuming and error prone task.

Traditionally, corporate accounting departments have relied on spending disclosure among each card carrying employee. Disclosure policies vary among corporations. For example, some may require the employee to submit a receipt and description of the charge following each purchase transaction. Others may require the employee to turn in receipts and a spending report at the end of each month. In either case, the accounting department is charged with the task of matching each billing statement entry with a corresponding receipt and/or entry in a spending report.

Regardless of policy, accounting departments regularly assign descriptive elements to the transactions listed in a billing statement in order to properly account for the purchases. Presently, most of the details are added to the statement after the purchase has been made and the transaction details are reviewed. However, this can be unreliable and resource intensive, especially in environments incurring a high level of transaction card spend. As such, there is a need for a system and method for performing highly reliable, pre-reconciliation of transactions by assigning an appropriate descriptive element to a single-use account number prior to its use. Such system may use preconfigured descriptive elements to match charges appearing within a billing statement with descriptive elements to present the corporation with a reconciled transaction to the business.

SUMMARY OF THE INVENTION

The invention includes a system and method for automatically describing and/or reconciling large volumes of transaction card transactions. The system provides pre-reconciliation of transactions in accordance with an assignment of appropriate descriptive elements to an account number prior to use. The system includes an interface wherein a program administrator may request one or more account numbers that are associated with a primary card account number, add a transaction descriptor to each account number, and specify constraints. Constraints may include, for example, an account number expiration date, a transaction amount limit, the type of spend the account number may be used for, and/or the like. Each account number is limited to a single purchase transaction, and as the charge posts to the account, the system matches the descriptive element to the transaction details.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

FIG. 4 is a web page screen shot of a card provider's exemplary online registration page for a transaction system;

FIG. 5 is a web page screen shot of a card provider's exemplary online log-in page for a transaction system;

FIG. 6 is a web page screen shot of a card provider's exemplary online drop-down menu used to select a primary charge card in the foreground and an online merchant's payment web page in the background;

FIG. 7 is a web page screen shot, displaying in the foreground, an exemplary secondary transaction number (e.g., Private Payments™ number) returned to the user; and in the background, a merchant's payment web page;

FIG. 12 is an screen shot of an exemplary transaction history report of the present invention;

DETAILED DESCRIPTION OF EXEMPLARY EMBODIMENTS

Figure 1:
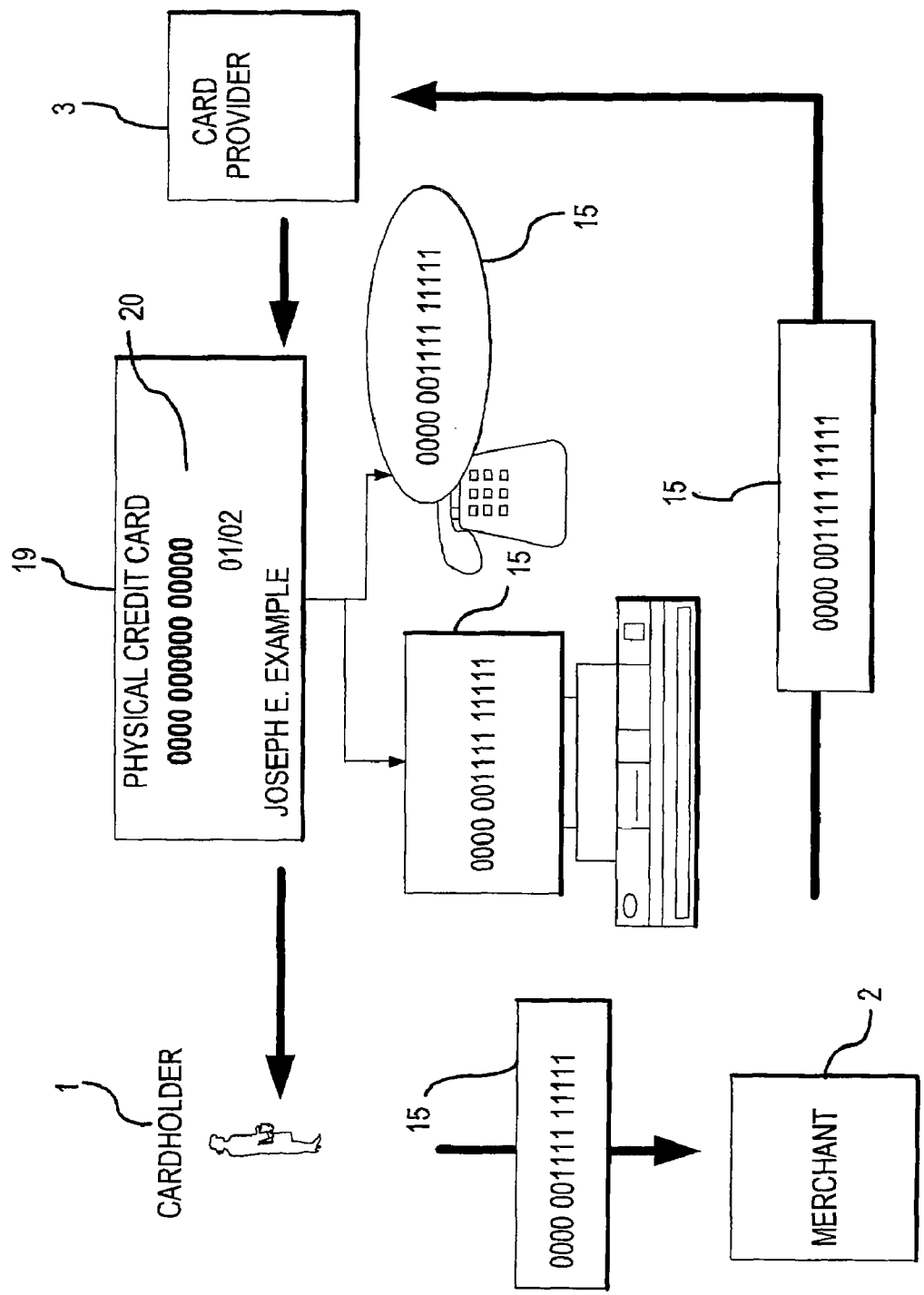
FIG. 1 is an overview of an exemplary system for facilitating a transaction.

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In general, the invention includes a system and method for automatically reconciling transaction card transactions through the use of single-use account codes that are created for a specific purchase transaction. While the invention contemplates the use of one or multiple use account codes, the invention will be described with respect to single-use account codes. For examples of single-use account codes, see Patent Application Publication No. 2006/0076400, "Limited Use PIN System and Method," filed on Oct. 7, 2004, and Patent Application Publication No. 2001/0034720, "System for Facilitating a Transaction," filed on Mar. 7, 2001, both of which are incorporated by reference. 2006/0076400 discloses a system for facilitating transactions via a limited use PIN that is associated with a primary account and/or PIN number, wherein the limited use PIN is presented to the merchant to initiate a purchase transaction. 2001/0034720 discloses a system for facilitating a transaction using a secondary transaction number that is associated with a cardholder's primary account. The cardholder may provide the secondary transaction number, often with associated limited-use conditions, to a merchant to facilitate a more secure and confident transaction.

In one embodiment, the invention includes a unique system for facilitating transactions that is easily and readily adaptable to existing commercial transaction processing systems. While the system may contemplate upgrades or reconfigurations of existing processing systems, changes to cardholder or merchant systems are not necessarily required by the present invention. For example, the present system may contemplate, but does not require: downloading of software modules; a digitally-based, non-physical commerce card; activation or deactivation of the secondary transaction number; and certain embodiments do not require the existing online customer to separately register for the service. Moreover, the transaction system herein described can be seamlessly integrated into current electronic commerce processes with minimal to no changes to existing systems used by cardholders or merchants.

As used herein, "transaction" or similar terms may include any exchange of a monetary value for goods and/or service. Specifically, with regard to the present invention, a transaction takes place when a holder of a transaction account provides an account code to a service establishment in order to facilitate a transfer of funds from the transaction account to the service establishment. A service establishment may comprise any merchant of goods, services, information and/or other items.

An "account", "account number" or "account code", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the system may include a fob embodiment, the invention is not to be so limited. Indeed, system may include any device having a transponder which is configured to communicate with RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the customer. A merchant account number may be, for example, any number or alpha-numeric characters that identify a particular merchant for purposes of card acceptance, account reconciliation, reporting, or the like.

Referencing the computer networked aspect of a preferred embodiment of this invention; each participant is equipped with a computing system to facilitate online commerce transactions. The computing units may be connected with each other via a data communication network. The network is a public network and assumed to be insecure and open to eavesdroppers. In the illustrated implementation, the network is embodied as the internet. In this context, the computers may or may not be connected to the internet at all times. For instance, the cardholder computer may employ a modem to occasionally connect to the internet, whereas the card provider computing center might maintain a permanent connection to the internet. It is noted that the network may be implemented as other types of networks, such as an interactive television (ITV) network.

The merchant computer and the card provider computer may be interconnected via a second network, referred to as a payment network. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® network.

Figure 15:
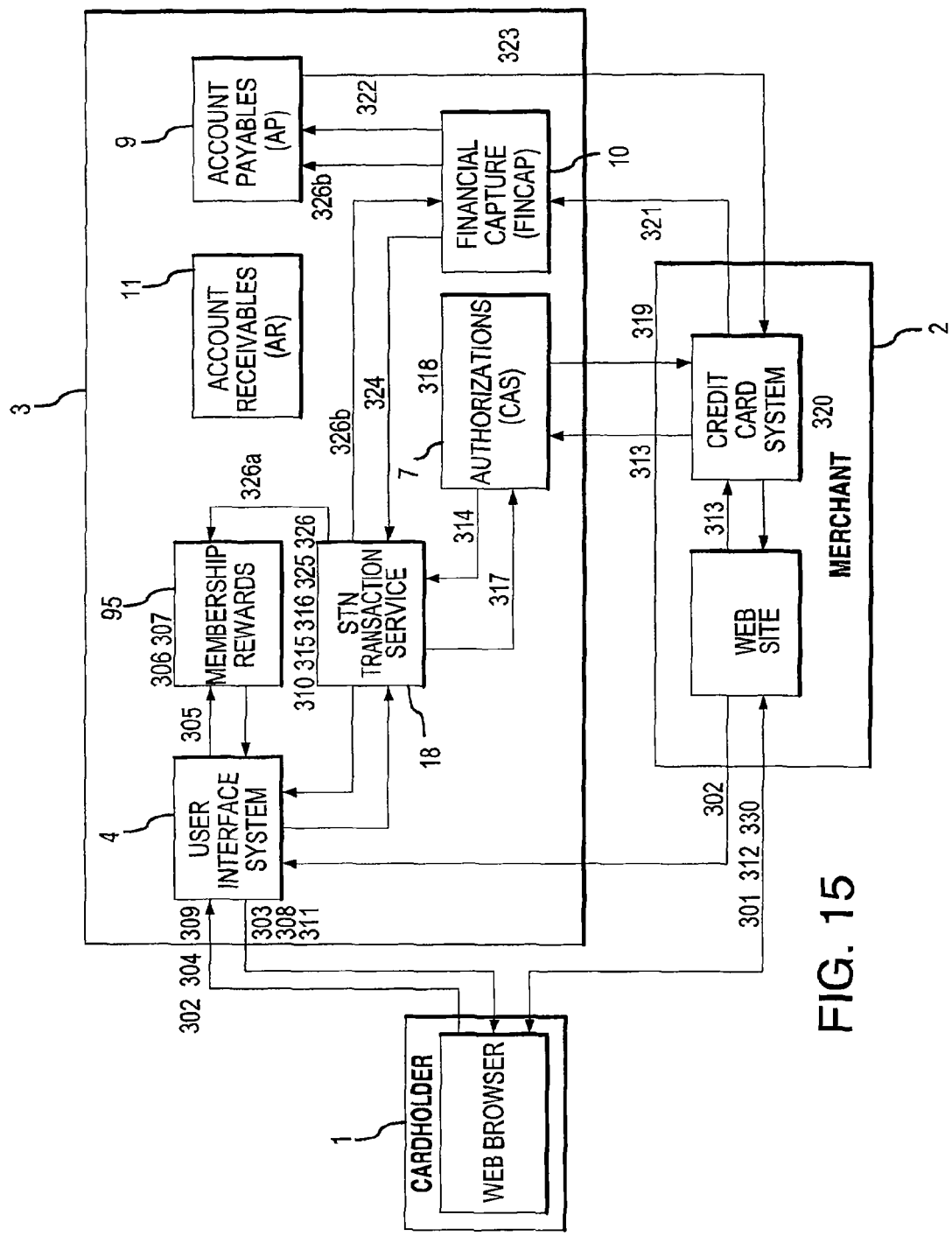
FIG. 15 is a flow diagram depicting a second embodiment of an exemplary transaction system of the present invention used to facilitate a membership rewards program.

As depicted in FIG. 15, the present invention generally relates to a transaction system where a first party to a transaction ("cardholder 1") provides to a second party to a transaction ("merchant 2") a secondary transaction number (STN) 15 that was generated by an issuer ("card provider 3"). In a preferred embodiment, although not required, the STN 15 is immediately usable by the cardholder 1 without need for activation and may have associated therewith cardholder 1, card provider 3, or merchant 2 defined conditions or parameters of use restrictions which limit use of the STN 15. A "transaction," as defined herein, includes, inter alia, any exchange or delivery of value, exchange or delivery of data, gifting of value or data, etc. The term "transaction" not only contemplates an exchange of goods or services for value from one party to another, but also the gifting of something from one party to another. Additionally, transaction or charge card numbers are account numbers that are used to facilitate any type of transaction.

While an exemplary embodiment of the invention is described in association with a transaction system, the invention contemplates any type of networks or transaction systems, including, for example, unsecure networks, public networks, wireless networks, closed networks, open networks, intranets, extranets, and/or the like.

The first party to the transaction (referred to herein as a "cardholder 1") is any individual, business or other entity who uses a STN 15 to facilitate any transaction. In a preferred embodiment, the cardholder 1 establishes a new or has an existing relationship or association with a card provider 3. For example, in one embodiment, a cardholder 1 may be an American Express® card member. In another embodiment, a cardholder 1 may be a participant in a frequent flyer rewards program. In a further embodiment, the cardholder 1 is a member of any suitable organization that provides transaction products or services. Another embodiment contemplates the cardholder gifting a secondary transaction number to a second party. The term cardholder 1 may also be referred to herein as "consumer," "card member," "user," "customer" or the like.

The second party to the transaction (referred to herein as a "merchant 2") is any individual, business, or other entity who receives a secondary transaction number, whether or not in exchange for goods or services. For example, in one embodiment, a merchant 2 may be an online bookstore such as Amazon.com®. In another embodiment, a merchant 2 may be a local plumber. In yet another embodiment, a merchant 2 may be a local hardware store. In some instances, the cardholder 1 and the merchant 2 may be the same. In other situations, the merchant 2 and the card provider 3 are the same. Although referred to herein as a "merchant," this term contemplates situations where any second party receives a secondary transaction number from the first party: such as, for example, where a cardholder 1 gifts a secondary transaction number to another individual (i.e., second party merchant).

The issuer ("card provider 3") includes any provider of products and/or services that facilitates any type of transaction. As contemplated by an exemplary embodiment of the present invention, the card provider 3 establishes and maintains account and/or transaction information for the cardholder 1. The card provider 3 may issue products to the cardholder 1 and may also provide both the cardholder 1 and the merchant 2 with the processes to facilitate the transaction system of the present invention. The card provider 3 includes banks; credit unions; credit, debit or other transaction-related companies, telephone companies; or any other type of card or account issuing institutions, such as card-sponsoring companies, incentive rewards companies, or third party providers under contract with financial institutions. Unless otherwise specifically set forth herein, although referred to as "card provider," this term should be understood to mean any entity issuing any type of account to facilitate any transaction, exchange or service; and should not be limited to companies possessing or issuing physical cards. In an exemplary system, the card provider 3 may be any transaction facilitating company such as a charge card provider like American Express®, VISAS®, Mastercard®, Discover®, etc. In another embodiment, the card provider 3 could be any membership organization or union. In some instances, the card provider 3 and the merchant 2 may be the same, for example, where the STN 15 is issued by the same entity that provides the product or service. A STN 15 phone card issued by a telephone company, where the STN 15 phone card is tied to a primary telephone account is one such occasion.

An exemplary STN 15 is any transaction number, code, symbol, indicia, etc. that is associated with another number or account that has been designated by the cardholder 1 or the card provider 3 as a primary charge card (PCC 20), i.e., primary account number. In an exemplary embodiment, the STN 15 is a purchasing number that acts as a charge card number and is associated with a PCC 20 account (e.g., a main charge card, credit, debit card or other account number, such as a bank or brokerage account, reward program account, etc.). In an exemplary embodiment, a PCC 20 account is not identified by a STN 15. In certain embodiments, the PCC 20 account may have some identifying elements related to the STN 15. The PCC 20 is defined herein to include any type of transaction card that references any account, membership, affiliation or association. When more than one cardholder 1 account exists, the PCC 20 is the account that has been designated by the cardholder 1 or the card provider 3 as the primary account. Alternatively, there may be a hierarchy of accounts where the STN 15 is associated with one or more PCCs 20 in a designated order. Additionally, as depicted in at least one embodiment described herein, a STN 15 may be associated with two or more accounts. For example, a STN 15 could be associated with a non-currency based account and also a PCC 20 account.

As shown in FIG. 1, in a preferred embodiment, the STN 15 and the PCC 20 have the same format, although additional embodiments may provide for account numbers with varying formats. In an exemplary embodiment involving credit, debit or other banking cards, the STN 15 has the same industry standard format that is used for the regular banking cards (e.g., 15 or 16 digit numbers). Preferably, the numbers are formatted such that one is unable to tell the difference between a STN 15 and a regular physical charge card. Alternatively, however, the card provider/product identifier (e.g., BIN range, first 6 digits, etc.) numbers may be different so as to differentiate the STNs from regular charge card numbers. In referencing the STN 15 and the PCC 20 number, it should be appreciated that the number may be, for example, a sixteen-digit credit card number, although each card provider has its own numbering system, such as the fifteen-digit numbering system used by American Express. Each company's card numbers comply with that company's standardized format such that a company using a sixteen-digit format will generally use four spaced sets of numbers, as represented by the number "0000 0000 0000 0000." The first five to seven digits are reserved for processing purposes and identify the issuing bank, card type etc. In this example, the last sixteenth digit is used as a sum check for the sixteen-digit number. The intermediary eight-to-ten digits are used to uniquely identify the cardholder 1. The invention contemplates the use of other numbers, indicia, codes or other security steps in addition to the use of the STN 15, but in an exemplary embodiment, only the STN 15 is provided to the merchant 2.

In a preferred embodiment, the STN 15 is randomly and instantaneously generated by the card provider 3, usually upon a cardholder's request, and can be distributed to the cardholder 1 by a variety of methods (online, telephone, wireless, email, regular mail, etc.) all of which should be secure and dependent upon verification of the cardholder's identity. Unlike the temporary transaction numbers disclosed in the prior art previously discussed, in a preferred embodiment, although not required, the STN 15 is immediately active (and usable) once it is associated with the cardholder's designated PCC 20 and provided to the cardholder 1. This feature minimizes the possibility that a merchant 2 will obtain a transaction number that will be worthless because it was not properly activated by the cardholder 1. While the present invention may contemplate a previously allocated pool of numbers that needs to be activated, an exemplary embodiment of the present invention includes STNs 15 that are instantaneously and randomly generated, and are usable upon receipt by the cardholder 1 without the need for separate activation.

In another preferred embodiment, the STN 15 may have limited-use (or conditions-of-use) parameters placed upon it by the cardholder 1, merchant 2, or the card provider 3 in order for the numbers to be restricted for particular uses. Alternatively, the cardholder 1 is able to choose system default parameters of use. Parameters may include, for example: (i) use of the STN 15 is good for a predetermined number of transactions; (ii) cardholder-determined expiration dates (i.e., STN 15 will be generated with expiration dates that are associated but unrelated to the expiration date of the cardholder's PCC 20 number, other than that it cannot exceed the expiration date of the PCC 20 account); (iii) limiting use of the STN 15 to a specified dollar amount, dollar amount per transaction, total dollar amount for pro-designated number of transactions, maximum dollar amount per month, etc.; (iv) use of the STN 15 for a specified merchant only; (v) restricting use to a specified user, other than primary cardholder (e.g., child, spouse, gift recipient, etc.); or (vi) any combination of these or similar features, for example, a number can be used at a specified merchant only for a pro-designated number of transactions and for a maximum dollar amount. In an exemplary online embodiment, a cardholder 1 may desire to require all online transactions (e.g., purchases) be performed using only STNs, or alternatively, be performed only with specific merchants as defined. If the cardholder (or another individual) uses a physical charge card number for an online payment in violation of this condition, the card provider 3 would decline the authorization.

These parameters not only provide increased security, allowing a cardholder 1 to tailor the STN 15 to a particular use, but an ancillary benefit is the ability of a cardholder to select preferences to control spending for themselves or others who have registered eligibility to use the card (e.g., spouse, children, etc.). These preferences may include: Restrictions (cardholder 1 may choose to restrict use on certain sites or can pre-approve spending at particular sites); date range (cardholder 1 can select a period of time when transactions may occur); maximum budget amount (cardholder 1 can pre-set spending limits within certain periods of time or in certain categories (e.g. groceries, books, clothing)); credit and balance availability (cardholder 1 can check credit or demand deposit balance availability prior to transacting); non-currency based accounts, such as Reward Points as Currency (cardholder 1 can use reward points (e.g. Membership Rewards™, Blue Loot™) as currency to pay for purchases); and Gift Products (cardholder 1 can use a STN 15 to fund gift products to others for designated amounts).

Figure 2:
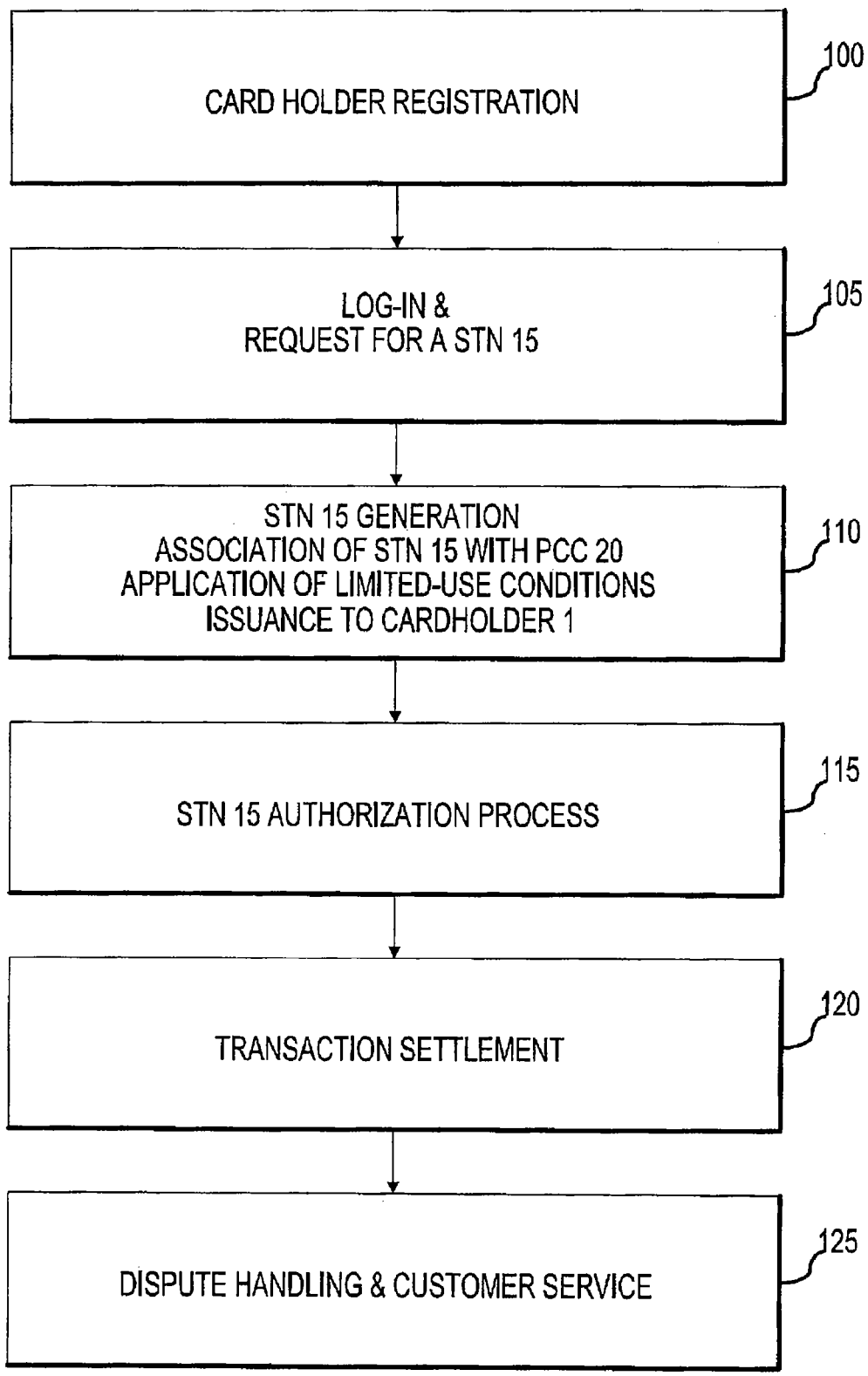
FIG. 2 is a flow diagram of exemplary processes of the present invention.

As shown in FIG. 2, an exemplary embodiment of the present invention includes steps for: (i) registering a cardholder 1 to use the card provider's 3 transaction services (step 100); (ii) receiving from a cardholder 1 a request for a STN 15 (step 105); (iii) generating a STN 15, associating the STN 15 with a PCC 20, applying limited-use conditions, if desired, and issuing the STN 15 to the cardholder 1 (step 110); (iv) processing a merchant's 2 authorization request involving the STN 15 to determine if use of the STN is authorized (step 115); (v) processing a settlement request, paying the merchant, and billing the cardholder 1 (step 120); and (vi) handling disputes and other customer service issues from the merchant or cardholder relating to use of the STN 15 (step 125).

Figure 8:
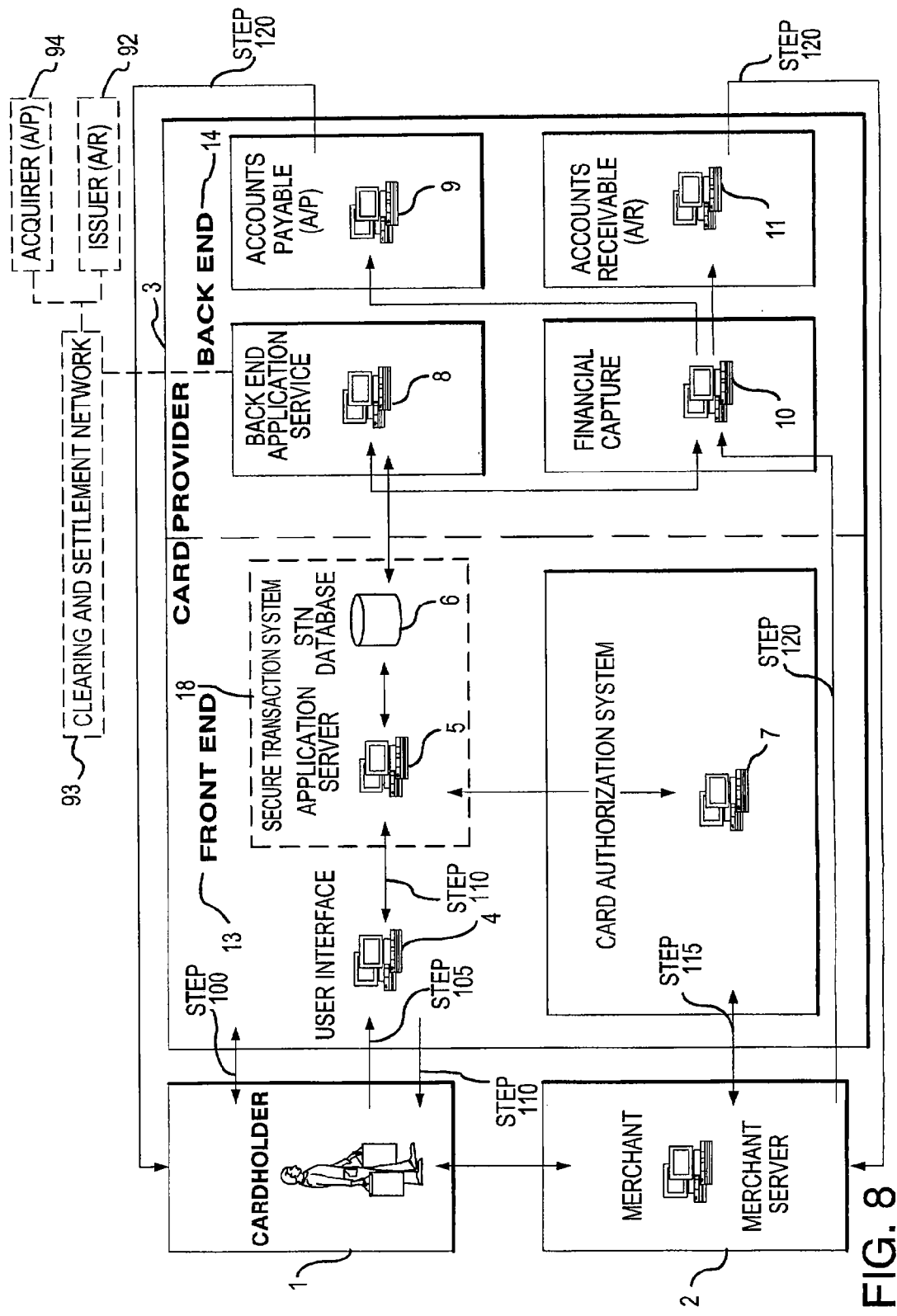
FIG. 8 is a block diagram of exemplary components of the present invention.
Figure 9:
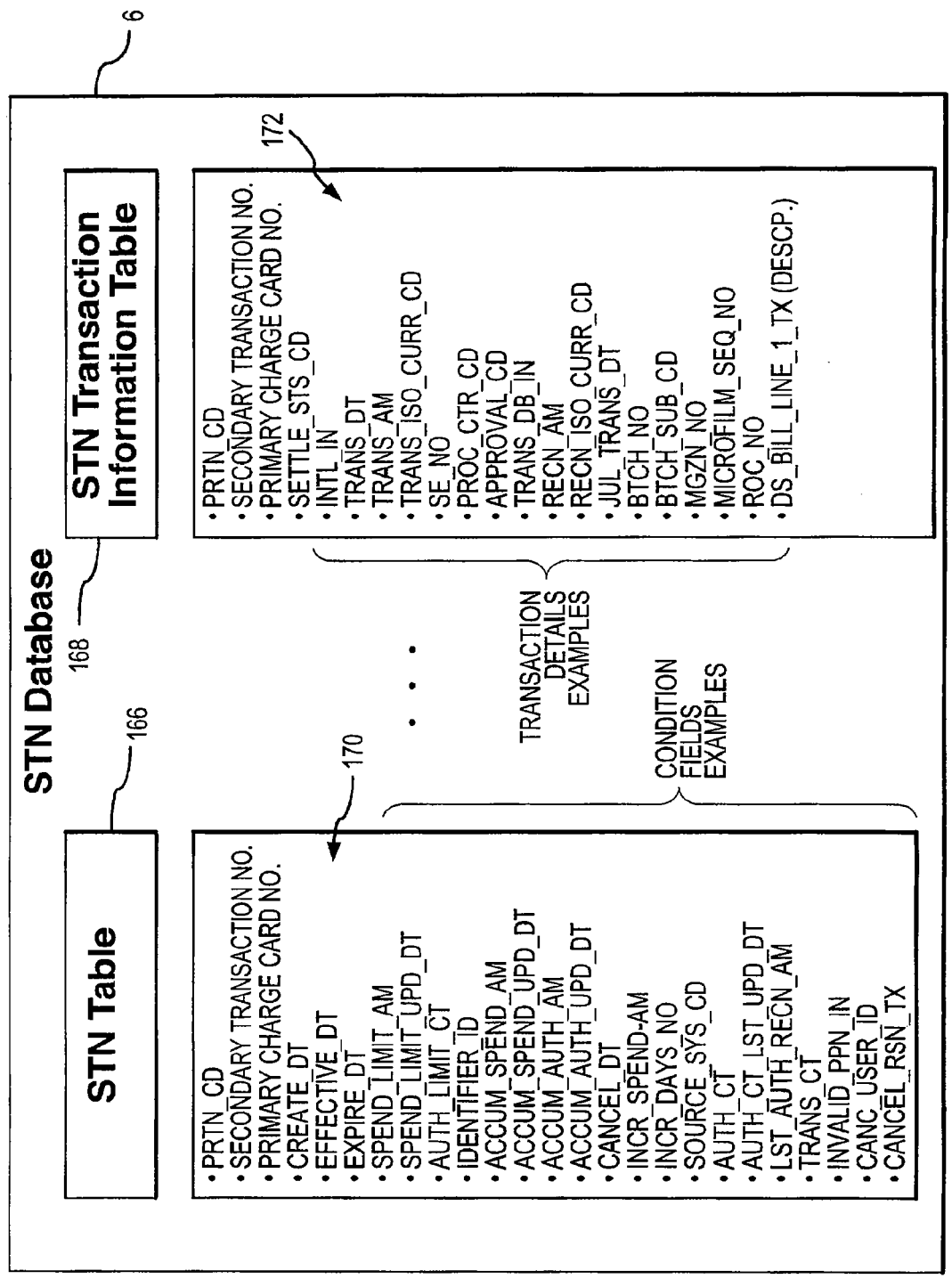
FIG. 9 is a block diagram of an example of some of the exemplary data structure of the STN database of the present invention.

FIG. 8 depicts an overview of the components of an exemplary transaction system. In general, the card provider's computer system utilizes front end 13 and backend 14 processing systems. The front end 13 system comprises, inter alia, a user interface system 4 (e.g., web server, IVR, etc), an application server 5, a STN database 6, and a card authorization system (CAS) 7. The application server 5 and STN database 6 may, at times, be referred to collectively as the STN transaction system (or service) 18. Referencing FIGS. 2 and 8, these front end 13 components facilitate (i) cardholder registration (step 100), (ii) request for a STN 15 (step 105), (ii) generation and issuance of the STN 15 (step 110), and (iv) the STN authorization process (step 115). The backend 14 system comprises, inter alia, a financial capture system 10, a back-end application service 8, an accounts payable system 9 and an accounts receivable system 11. Again referencing FIGS. 2 and 8, the backend 14 components facilitate transaction settlement (step 120). In an exemplary system, the dispute handling and customer service processes (step 125) include, inter alia, in addition to the above mentioned systems, a system for identifying a PCC 20 from a STN 15, a letter generating system for sending dispute inquiries to cardholders 1 and merchants 2, and a system that accepts incoming communication from merchants 2 and converts the STN 15 received to the PCC 20 for the purpose of facilitating the dispute handling process. More specifically, as shown in FIG. 8, the card provider 3 user interface system 4 provides the cardholder 1 with access to the card provider's transaction services. It is through this interface that the cardholder 1 may register with the card provider 3, may request a STN 15, and, in response thereto, will receive from the card provider 3 a STN 15 that is associated with his PCC 20. The front end 13 system also utilizes at least one application server 5 that processes incoming information, applies the appropriate business rules/condition sets as necessary, and generates appropriate outgoing responses. The application server 5 is configured to support interaction with, inter alia, the user interface system 4 and a STN database 6. An exemplary STN database 6 is a relational database comprising various tables for managing and translating a variety of information, such as cardholder 1 profiles, charge card data, transaction data, merchant data, conditions/rules set profiles, etc. FIG. 9 illustrates two examples of exemplary tables within the STN database 6. STN table 166 may contain a variety of database fields 170 relating to the cardholder's STN account. These fields may contain, in addition to general STN 15 and PCC 20 account information, the business rule/condition set profiles associated with use of the STN 15. A STN Transaction Information Table 168 contains database fields 172 for storing information relating to a particular transaction. As a skilled programmer can appreciate, the processing mechanisms and data structure methods can be structured in a variety of ways. In short, the user interface system 4, application server 5, and the STN database 6 are suitably connected to facilitate the generation and issuance of a STN 15 and are further associated with a card authorization system (CAS) 7, in order to process from the merchant 2 an authorization request involving a STN 15.

When processing a merchant's request for settlement, i.e., to be paid for a transaction, the financial capture (FINCAP) 10 system receives and captures the financial information (e.g., transaction amount, date, merchant identification (SE) number, STN 15, etc.). The back end application service 8 interfaces with the STN transaction system 18, as necessary, to determine if the number is a valid STN 15 (i.e., not a phony number). If the STN 15 is valid, the AP system 9 pays the merchant 2. The STN database 6 is updated to reflect the transaction information. The STN transaction system 18 (or alternatively the backend application service 8) substitutes the PCC 20 number for the STN 15 and forwards to the AR system II for billing.

Although the present system for facilitating transactions may exist within one card provider system, exemplary embodiments contemplate use with other third party authorization and settlement systems and networks. FIGS. 8 and II, for example, depict third party authorization networks (FIGS. II, 91 and 92) and settlement networks (FIG. 8, 93-95) that may be integrated to form parts and/or processes of the present invention. Exemplary processes of the present invention are discussed in greater detail below.

Figure 3:
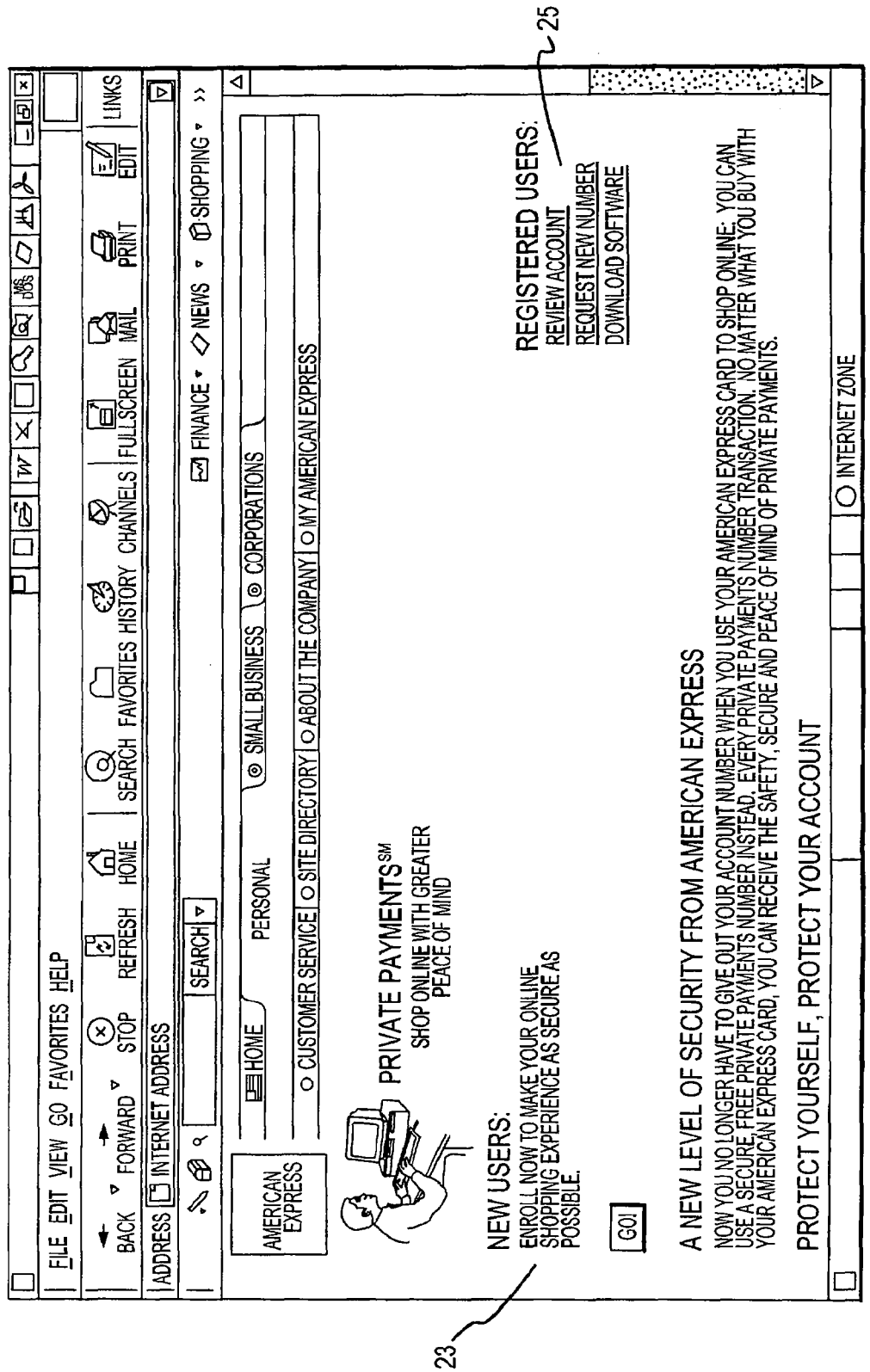
FIG. 3 is a web page screen shot of a card provider's exemplary splash page for a transaction system.
Figure 4:
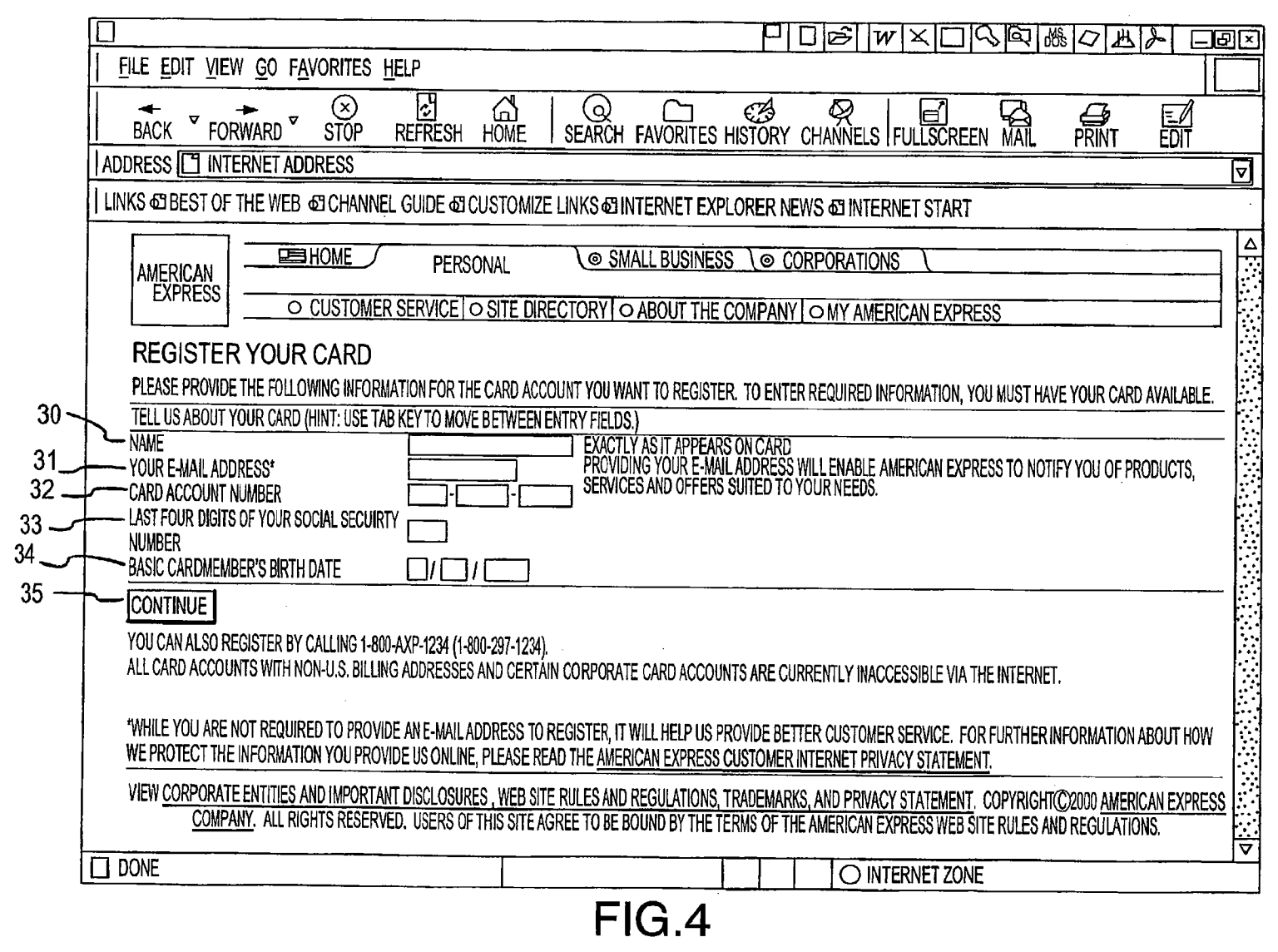

Two exemplary screen shots relating to an exemplary registration process are shown at FIGS. 3 and 4. FIG. 3 depicts a splash page for an American Express® Private Payments$^{SM}$ program. The Private Payments$^{SM}$ program is an exemplary embodiment of the present invention. Here, a new user 23 may enroll to use the program or an existing user may access a number of program features 25, e.g., review account, request a new STN 15 number or download software. The cardholder 1 generally enters this site by entering an appropriate card provider URL into her browser, by clicking on a link provided by a merchant's website, or alternatively, by an automatic pop-up feature that may appear upon recognizing particular URL or HTML codes.

To enroll (or register), the cardholder 1 is linked to a registration page (FIG. 4) and prompted for information. Information may include the cardholders name 30, email address 31, card account number 32 (e.g., PCC 20), last four digits of social security number 33, cardholder's date of birth 34, etc. Any suitable authenticating information will suffice. By selecting "continue," the cardholder 1 is provided with a username and password, or preferably, the cardholder is allowed to select her own username and password. The user interface system 4 processes this information and suitably interfaces with the STN transaction system 18 (FIG. 8) to register the cardholder. As one of skill in this art will appreciate, registration may take many forms and may be accomplished in a variety of ways. For example, a card provider 3 may choose to automatically enroll all new charge card applicants and return to the cardholder a username and password with the physical credit card. Although FIGS. 3 and 4 show an online registration process, it should be appreciated that this process may take place via any suitable user interface system.

In one embodiment, during the registration process, the cardholder 1 may choose to select or define various parameters, preferences, and programs to tailor the transaction system to the cardholder's particular needs. Additional embodiments allow the cardholder 1 to select or define parameters, preferences or programs at any point in the transaction process. In other words, the cardholder 1 has the flexibility to select parameters each time (e.g., during registration, log-in, upon STN request, etc.) a STN 15 is generated or may apply universal parameters to every STN 15 generated. With these selections, for example, the cardholder 1 may (i) designate a specific credit card to function as the primary charge card number; (ii) associate the transaction system with other programs such as a non-currency based membership rewards program, an online digital wallet, an online shopping gateway (e.g., American Express's "ShopAMEX"), an online gift check program (e.g. E-Gift), preferred buyer's programs, etc.; (iii) provide password protected access to family members; (iv) activate a smartcard feature allowing remote random generation of secondary transaction numbers; (v) designate cell phone, email or pager numbers to utilize with the voice or automated response secondary transaction number generation feature; (vi) and other banking and transaction features that may be apparent to those skilled in the art. For more information on loyalty systems, transaction systems, electronic commerce systems and digital wallet systems, see, for example, the Shop AMEX™ system as disclosed in Ser. No. 60/230,190 filed Sep. 5, 2000; the MR as Currency™ System disclosed in Ser. No. 60/200,492 filed Apr. 28, 2000 and Ser. No. 60/201,114 filed May 2, 2000; Wireless MR as disclosed in Ser. No. 60/192,197,296 filed on Apr. 14, 2000; a digital wallet system disclosed in U.S. Ser. No. 09/652,899 filed Aug. 31, 2000; a stored value card as disclosed in Ser. No. 09/241,188 filed on Feb. 1, 1999, all of which are herein incorporated by reference.

Figure 5:
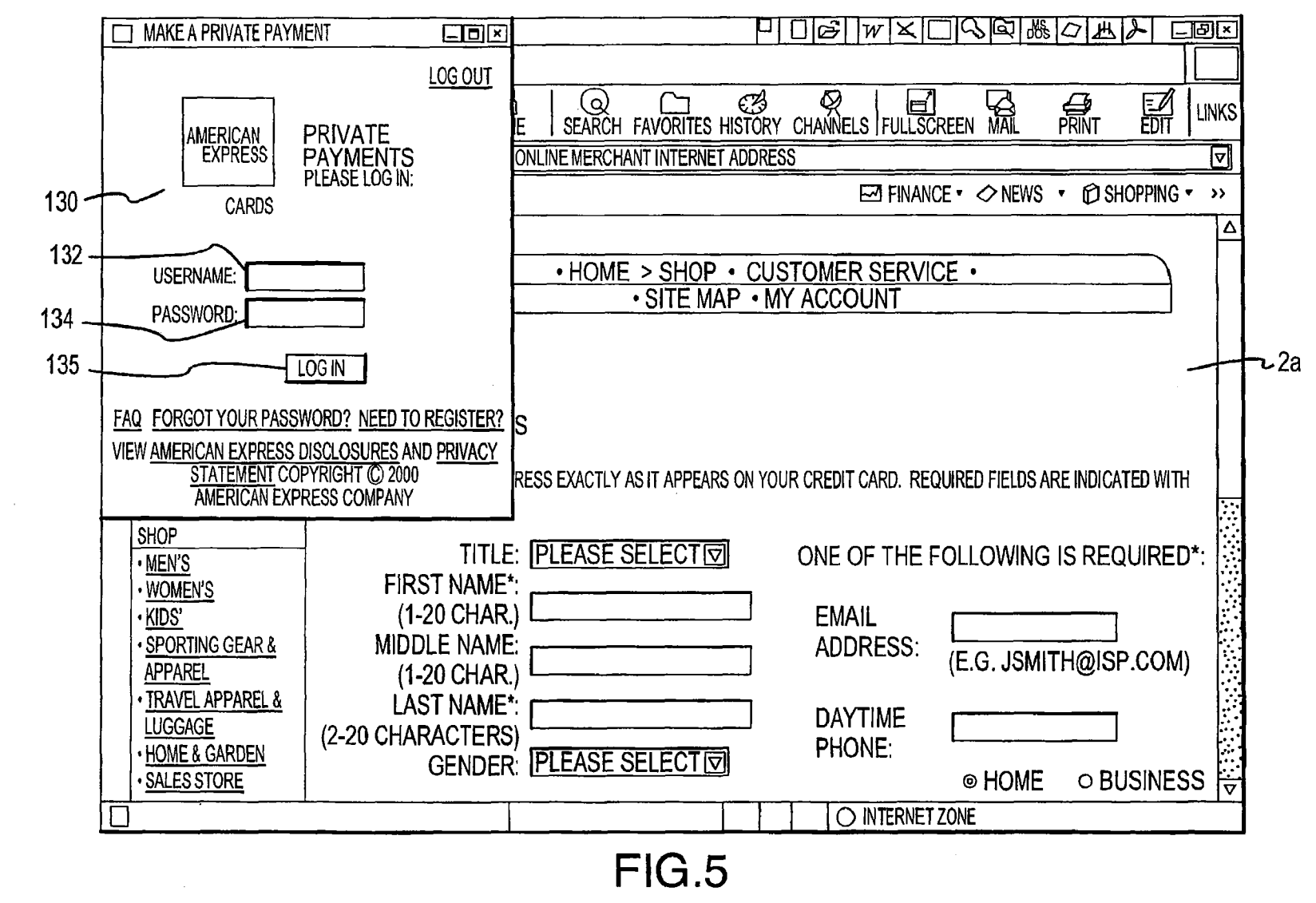
Figure 6:
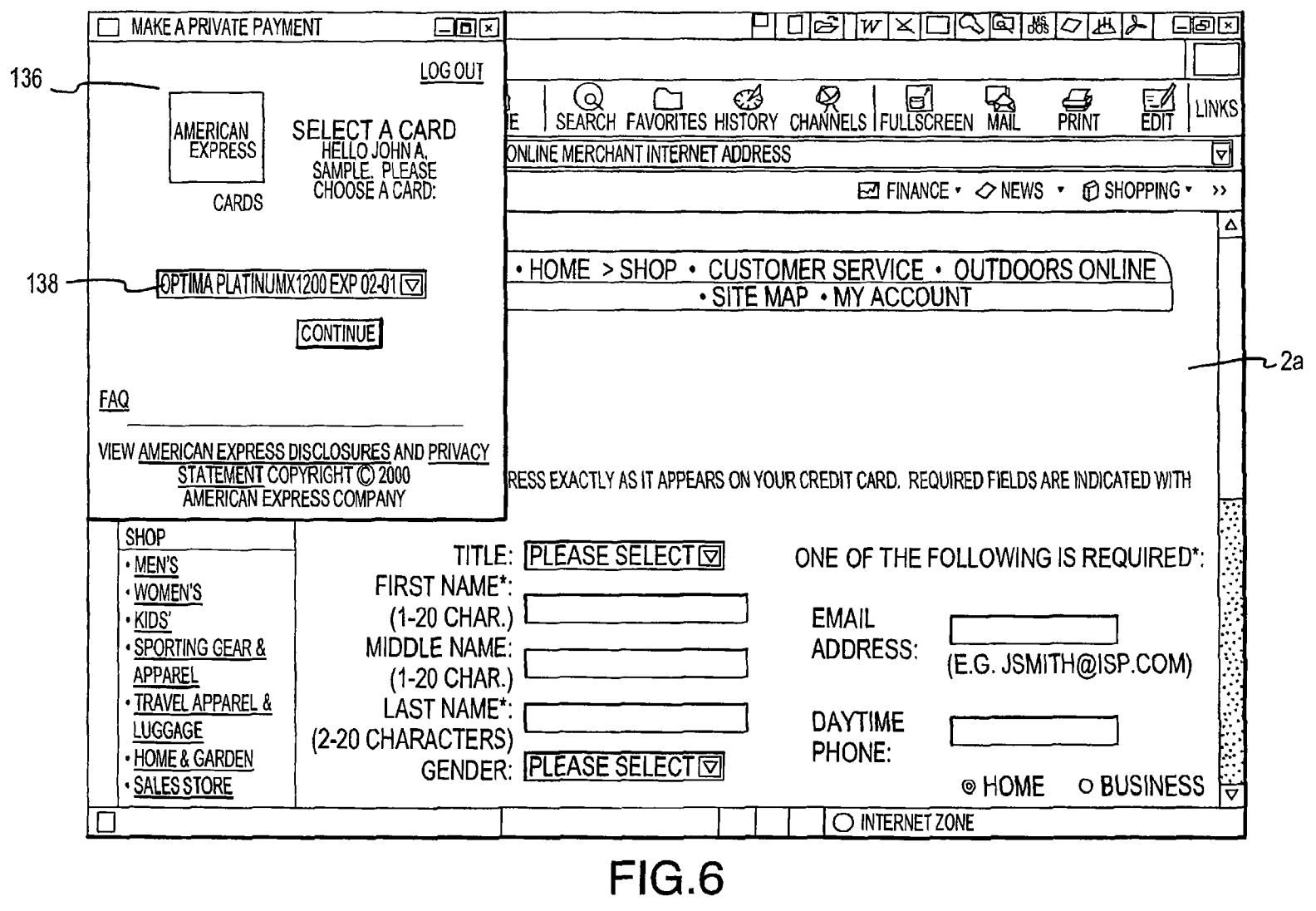

A registered cardholder 1 generally accesses the card provider's transaction system by logging into the system via any suitable user interface system 4. FIG. 5 depicts an exemplary online log-in screen 130, where the cardholder 1 is prompted for authenticating information such as a username 132 and password 134. Alternative systems contemplate authentication via any suitable user interface system. For example, an embodiment employing a portable data device such as a smart card facilitates authentication by swiping the smart card through a smart card reader and providing the appropriate PIN. After entering the appropriate authenticating information and clicking the log in button 135, the information is routed through the user interface system 4 (e.g., web server) to the application server 5, where, as shown in FIG. 5, the application server 5 retrieves information relating to the cardholder's account from the STN database 6. If the cardholder 1 has registered multiple charge card accounts, in one embodiment 136, as depicted in FIG. 6, the program prompts the cardholder 1 to choose from a list of accounts from a pull-down menu 138. The cardholder 1 then selects~least one account to be the primary account or to be included in a primary group of accounts (when it is desired for the STN 15 to be associated with more than one account). In other embodiments, the user interface system 4 (e.g., web server) will return additional options for the cardholder 1, such as prompting the cardholder 1 to choose from several condition fields such as those previously mentioned (e.g., restricting use to a particular merchant, amount, allowing use by other recipients, etc.).

Figure 7:
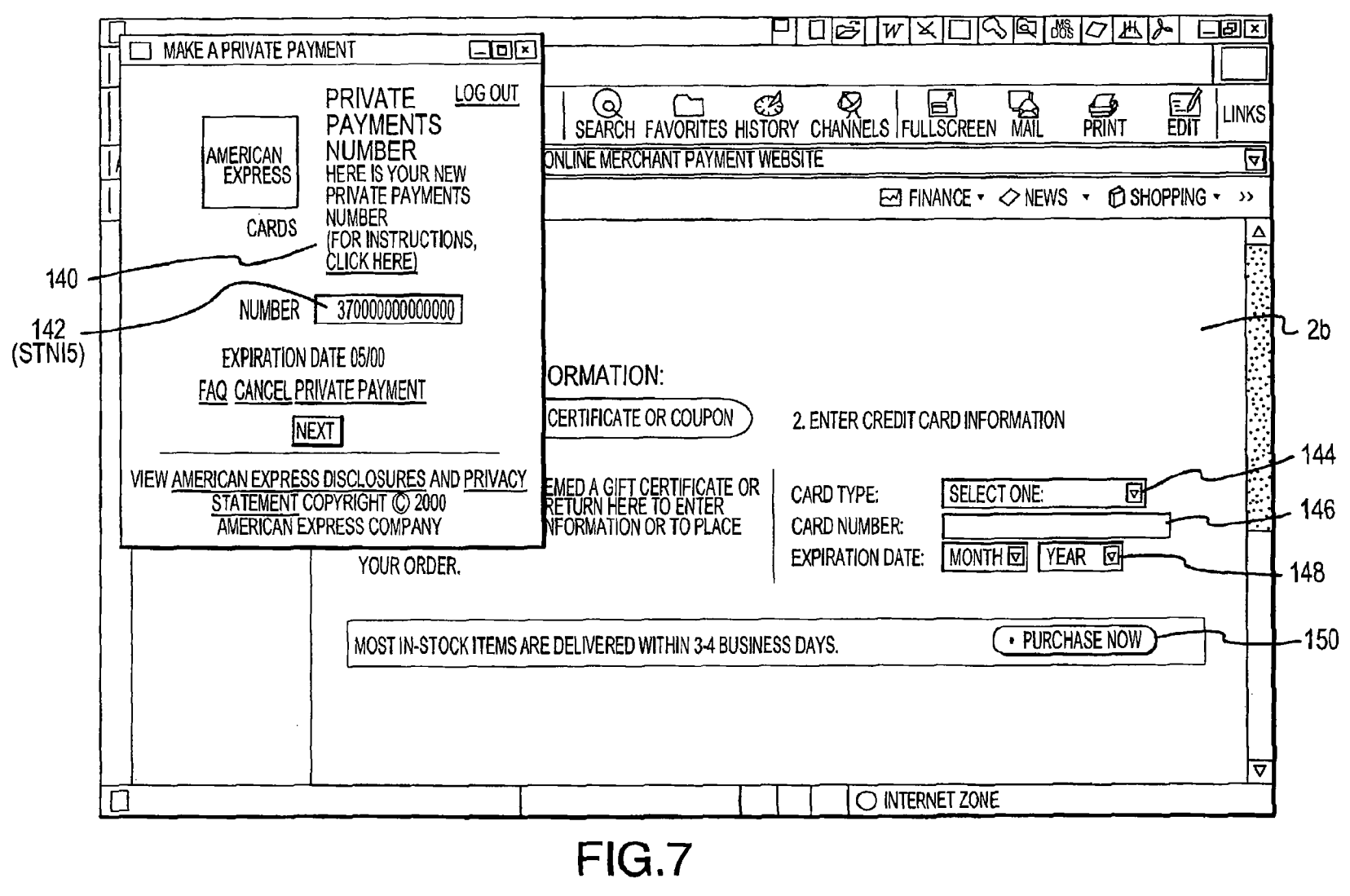

An exemplary online transaction process begins with a cardholder 1 desiring to purchase products or services from an online merchant's website. In this exemplary online system, the cardholder 1 selects products from a merchant's online website 2, is routed or clicks to the merchant's payment page 2a (FIG. 5). The cardholder 1 is hyperlinked (manually or automatically) to a card provider's web site to log in 130 (FIG. 5), which resides on and is managed by the card provider's user interface system 4 (e.g., web server), and, upon logging in, obtains a STN 15 that may then be "cut and pasted," "dragged and dropped" (or alternatively, automatically filled by the card provider 3 or downloaded from a digital wallet) into the payment fields 144, 146, 148 (FIG. 7) on the payment web page 2b (FIG. 7). In alternative embodiments, the system includes one or more of the following: the card provider 3 sends the STN 15 directly to the merchant 2, the STN 15 is encrypted or encoded, the cardholder 1 enters additional security numbers or other indicia or a biometric sample is required from the card provider 3. In an exemplary embodiment, the STN 15, as will be discussed next, is generated by the card provider's application server 5 and STN database 6.

After authenticating a cardholder 1 during the log-in process, and receiving a request for a STN 15, the process begins for generating a STN 15. The user interface system 4 prompts the initiation of the number generation process in the STN transaction system 18. In an exemplary random number generation process, the STN 15 is generated (preferably immediately) and provided to the cardholder 1 (preferably contemporaneous with the cardholder's request). As previously noted, this allows the number to be usable immediately upon receipt by the cardholder 1 without the need for separate activation (although separate activation features are contemplated by the present invention), while minimizing any increased risk of theft or fraud.

Figure 10:
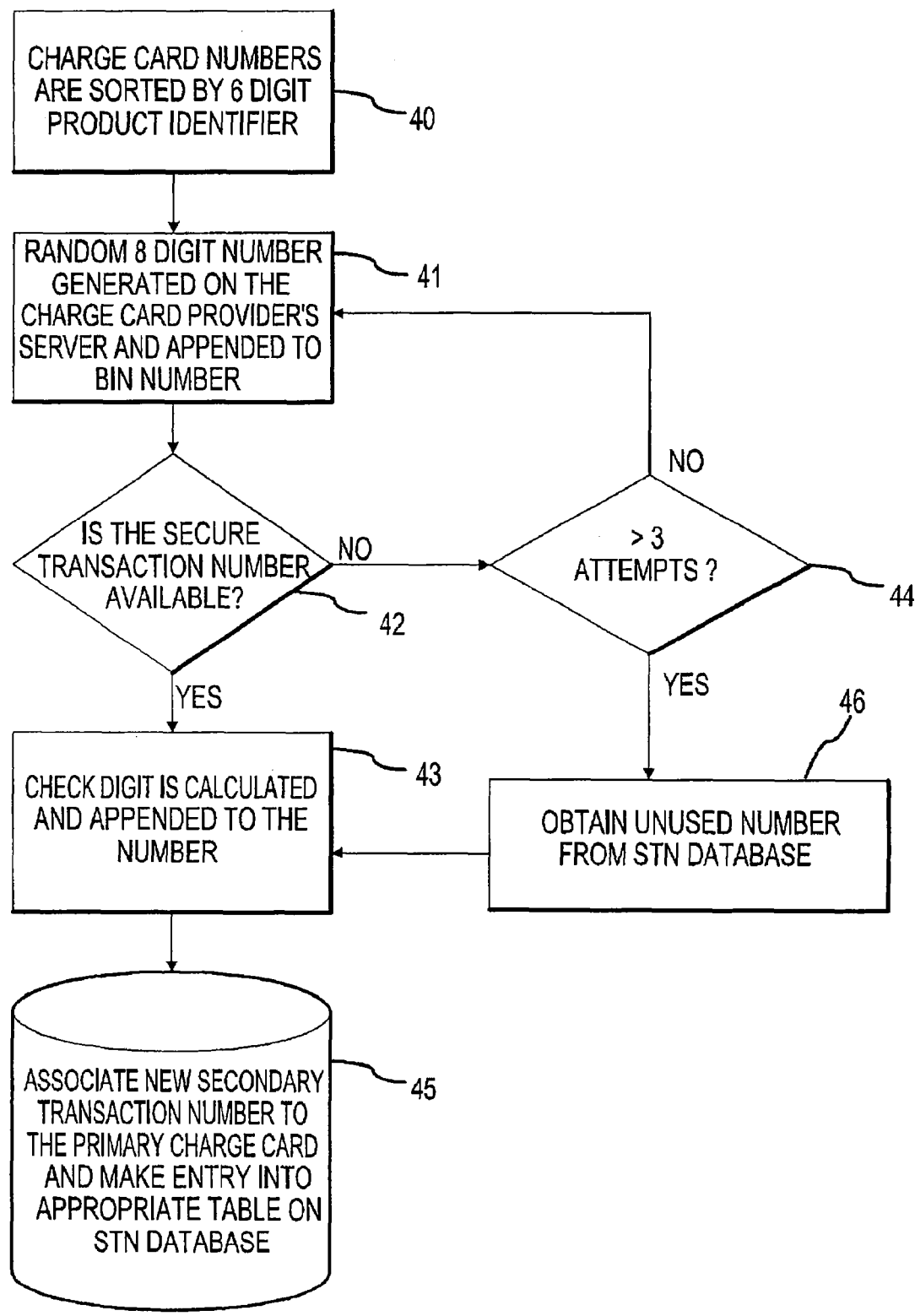
FIG. 10 is a flow chart of an exemplary secondary transaction number generation process of the present invention.
Figure 11:
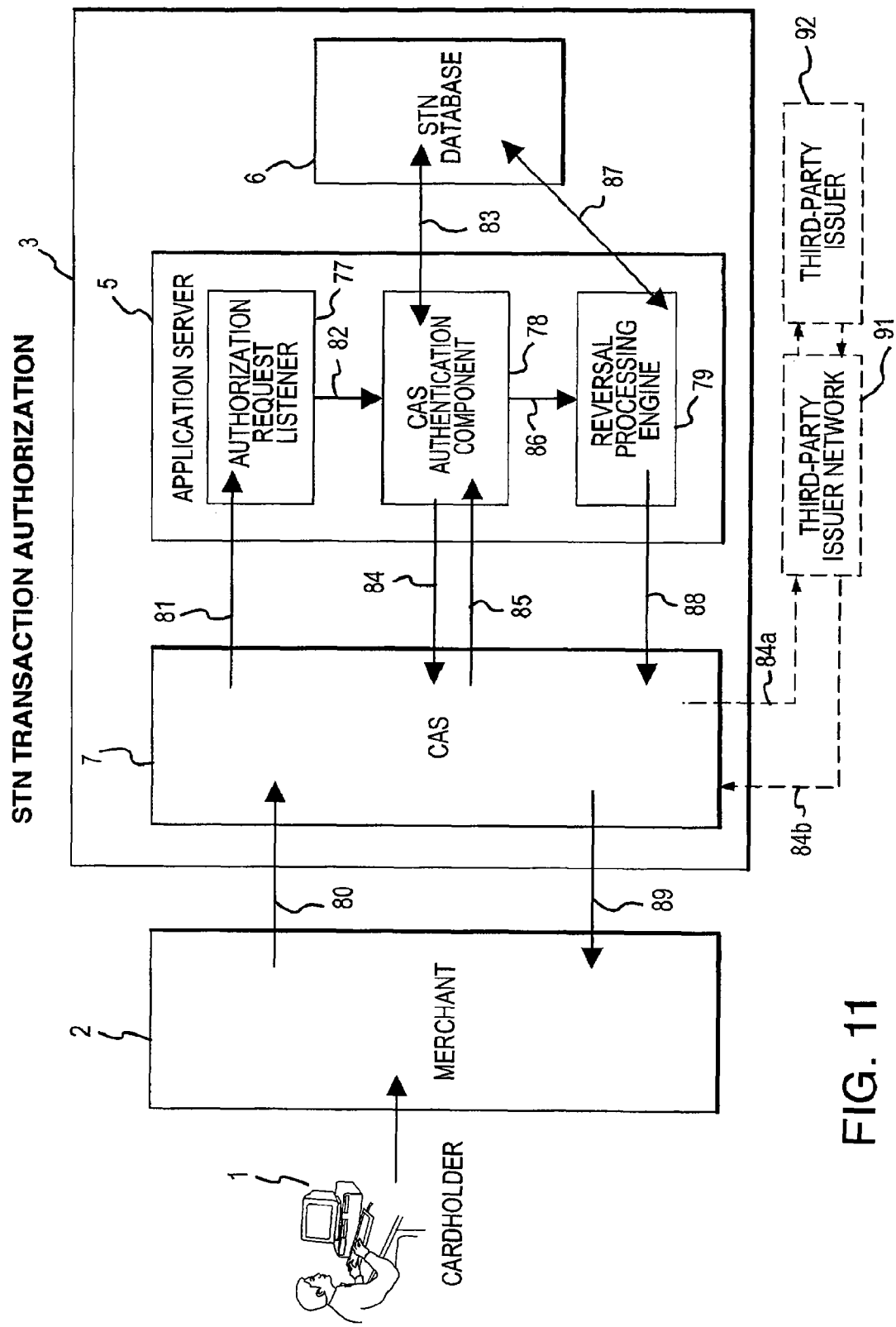
FIG. 11 is a flow diagram of an exemplary transaction authorization phase of the present invention.

An exemplary random number generation process is depicted in FIG. 10. In this exemplary embodiment, each card provider 3 (FIG. 1) is generally identified by a range of numbers on the physical card, typically called the bank identification number (BIN). Each card possesses a product identifier (e.g., first 6 digits. BIN, etc) that is not part of the random number generation process, but in order to initiate the process, this number must first be selected (step 40). It may be preferable for a card provider 3 to set aside a set of product identification numbers relating to secondary transaction numbers for specific use with the transaction system. Alternatively, however, some card providers may find it desirable to use the same BIN number designation for both STNS 15 and regular charge card numbers so that one cannot distinguish between the two types of numbers. As depicted in FIG. 10, a random eight digit number is generated by the card provider's application server 5 using an algorithmic process (step 41). The application server 5 verifies that the randomly generated number is available (i.e., it is not in use nor has it been used within a certain period of time) (step 42). If the transaction number is free (i.e., not in use), a check digit and the selected product identification number is appended to the number (step 43). This newly created STN 15 is then associated with the cardholder's PCC 20 and is provided to the cardholder 1 (step 45), whereupon the STN database 6 is updated to reflect that this particular STN 15 is in use and associated with a PCC 20 account. If, during step 42, it is determined that the number is in use, the number generation process is repeated up to a preset number of times (e.g., 3) (step 44). After attempting and failing to generate a non-used random number for a preset number of times, a non-used random number is physically selected from the STN database 6 (step 46).

After the STN 15 is generated, conditions of use parameters are applied, and are associated with the PCC 20, the STN 15 is then distributed (i.e., issued) to a cardholder 1 for use in facilitating a transaction. Communication of the STN 15 may occur via a number of use interface systems 4. For example, FIG. 7 depicts an exemplary online interface where the STN 15 (Private Payment number) is returned to the cardholder 1. This embodiment shows how the card provider window 140 overlays a merchant's online payment page 2b. The cardholder 1 selects the appropriate charge card (e.g., American Express®) from the credit type filed 144. The cardholder 1 is then able to "cut and paste" or "drag and drop" the STN 15 (present in the STN field 142) into the credit card field 146 on the webpage 2b. Finally, the cardholder 1 chooses the appropriate expiration date 148 and completes the transaction by selecting the "purchase now" button 150. Although this embodiment describes linking to a card provider's web site to receive a STN 15, an additional embodiment configures the user interface 4 (e.g., web server) and STN transaction system 18 to seamlessly interact with the merchant's website to eliminate the need to separately link to the card provider 3. In this instance, the generation and issuance of the STN 15 would use the merchant 2 as a gateway to the card provider 3. Any number of interface systems 4 can be used to facilitate the processes described above (FIG. 2 steps 100, 105, 110).

For example, as just described, distribution of the STN 15 may occur via a "server to desktop" arrangement where a connection is established between the card provider's web-server 4 and the cardholder's 1 desktop computer, using SSL 3.0. With this exemplary system, the number is generated by the application server 5 (according to an algorithmic processing feature) utilizing a random number generation process such as that previously described and delivered to the web server 4. The number is then displayed on the cardholder's 1 desktop. While pre-registration is not required, in an exemplary embodiment, a cardholder 1 will have previously registered at the card provider's 3 online web site providing all required personal information, primary charge card account numbers, and establishing a cardholder ID and password (if not already established). The cardholder ID and password are then used for verification of cardholder 1 identity when logging into the card provider's web server 4.

Distribution of STNs 15 may also occur via a "server to IVR" arrangement, where a cardholder 1 calls the card provider 3 in order to obtain a STN 15. In this exemplary embodiment, a voice response menu enables the cardholder 1 to choose the transaction option, and allows the cardholder 1 to enter a main account number. Once identity is verified, a link to the application server 5 is established, prompting generation and delivery of a STN 15 over the phone. In this embodiment, the cardholder 1 provides authenticating information by providing date of birth (DOB), a PIN, etc. Once this verification number is matched to customer's records, the STN 15 is distributed. Of course, this process would also work with a live operator arrangement.

Additional distribution embodiments include a number of different delivery vehicles and/or portable data devices, such as use of wireless devices, smart chip encoded devices, personal digital assistants (PDAs), pagers, interactive IVs, etc. For example, a "server to wireless device" is used where a wireless phone with internet browser is able to access the card provider's transaction site via the card provider's online service web site. The STN 15 can be delivered via text or voice. Additionally, with the use of encryption keys, the wireless device can be used as payment vehicles (e.g., STN 15 is delivered from the cardholder 1 to merchant 2 or other customer with Blue Tooth or other beaming technology). Again, verification of identity can be accomplished by a variety of means, including cardholder ID and password, DOB, PIN number, SIM cards in phones, etc.

Another exemplary embodiment of the transaction system, utilizing one or more of the distribution arrangements above, includes situations where a Point of Sale terminal (POS) is not present (e.g., submitting a STN 15 to a merchant 2 such as, for example, a plumber at home). In this exemplary embodiment, the cardholder 1 may not have cash or may not want to provide her PCC 20 number to the vendor due to concerns about unauthorized re-use. As such, the cardholder 1 calls the card provider 3 seeking to obtain a STN 15 with either predefined conditions of use or cardholder determined conditions of use. A voice recognition system asks for a PCC 20 number, the amount she wants to authorize, a merchant ID (e.g., SE number), or any other conditions of use. The voice recognition system communicates with the application server 5 and, alternatively, also CAS 7, to generate the STN 15. The STN 15 is then transmitted to the cardholder 1 who in turn provides to the merchant 2. Additionally, the merchant 2 can also receive, if desired, an immediate call from the voice response unit to provide an approval code. One skilled in the art will appreciate that this system can be used in association with landline phones, cellular phones, pagers, handheld computers or any other PDA devices.

Another exemplary embodiment of the present invention utilizes a smart card system or similar portable data device to generate and/or distribute a STN 15 to the card provider I or merchant 2. The smart card may facilitate the generation of a STN 15 in a number of different ways. In one embodiment, the smart card device itself generates the STN 15 from a self-contained processing chip. In another embodiment, the smart card interfaces with the card provider's user interface system 4 to cause the card provider 3 to generate a number. In another embodiment, the smart card supports interaction with a merchant's transaction processing system. "Smart card" is referred to herein to include any microchip enabled transaction card that is capable of being read by a smart card reader, and is also referred herein to generally refer to any portable data device that is capable of processing information. In an online embodiment, the cardholder 1 installs a smart card reader and associated software to be used with the cardholder's computer system that is capable of connecting to the internet. When desiring to make an online purchase, the cardholder 1 swipes or inserts his smart card through a card reader and enters an appropriate PIN. Once properly authenticated, the card provider transaction system generates and issues a STN 15 to the cardholder I. In another embodiment, the merchant 2 may have a smart card reader capable of interfacing with the cardholder's smart card. In this embodiment, the cardholder 1 swipes or inserts the smart card through the merchant's reader, a PIN is entered and the STN 15 is displayed to the merchant 2. Additional information relating to smart card and smart card reader payment technology is disclosed in Ser. No. 60/232,040, filed on Sep. 12, 2000, and U.S. Pat. Nos. 5,742,845; 5,898,838 and 5,905,908, owned by Datascape; which are hereby incorporated by reference.

With an exemplary online smart card embodiment, the cardholder 1 interfaces with the card provider's user interface system 4 (e.g., website) and registers the smart card for use with the transaction system option. The cardholder 1 downloads a program and the program is stored on the cardholder's computer. A STN transaction icon (e.g., Private Payments$^{SM}$ button) appears on the cardholder's browser or an icon appears on the display (e.g., Microsoft Windows® system tray). This button, driven by a card provider specific application (activator) that resides on the cardholder's computer, appears each time the cardholder 1 launches the browser (or alternatively the button appears at any predetermined intervals, cycles or URLs).

The cardholder 1 suitably links to an online shopping site, orders a product or service or fills a shopping cart and goes to the payment page. The cardholder 1 clicks the STN payments button on the browser or the icon on the display (or the activator automatically launches the STN button) and a pop-up window appears, asking the cardholder 1 to enter the smart card into the smart card reader and, in a preferred embodiment, enter his PIN number. In an alternative embodiment, a PIN may not be necessary. In another embodiment, any other security data or functionality may be included. Upon entering this information, the STN 15 will be generated by the card provider's STN transaction system 18 (FIG. 8), or, in another embodiment (discussed below) will be generated directly from the smart card chip; and a pop-up screen containing the STN 15 number will be displayed on the computer. The cardholder 1 then "drags and drops" or "cuts and pastes" the randomly generated STN 15 and other transaction information (e.g., card type, expiration date) into the online order form and completes the transaction. In an alternative embodiment, the STN 15 and other transaction information are automatically filled into the web shopping page by the card provider's web server.

Another exemplary embodiment of the present invention integrates a smart card with an online merchant's website, which may or may not be utilized by the cardholder 1. For example, in one aspect of this embodiment the smart card cardholder goes to a merchant website and a "smartchip" payments checkout button appears on the credit card payments page. The card provider's transaction system will be invoked if the cardholder 1 checks out via the smartchip payments button. In a preferred embodiment, the transaction system option is "behind the scenes." The cardholder 1 goes to an online shopping site, orders a product or service or fills a shopping cart and goes to checkout page. The cardholder 1 clicks the smartchip payments button on the browser and a pop-up window appears, asking the cardholder 1 to enter the smart card into the smart card reader and, optionally, enter his PIN number. Upon entering this information, the system logs the cardholder 1 into smartchip payments checkout process. The cardholder 1 will hit "check out" and the smartchip payments checkout process may auto-generate and auto-fill the STN 15 and transaction information into the appropriate payment field (an applet may be read off of the smartcard to transfer number to merchant site.) In this embodiment, the STN 15 will be auto-generated off the chip, where the smart card chip may use the Java or Multos operating systems and may use a random number generating algorithm. In one embodiment, the smart card chip is able to access the card provider's transaction system or, alternatively, contain a pool of possible numbers (in order to avoid generating the same number twice). The number is also need sent back to the STN transaction system 18 in order to match the PPC 20 number with the STN 15.

In another embodiment using a smart card, a secure electronic transaction (SET) protocol is used to avoid or minimize system/server contact. In this embodiment, the PCC 20 number is on the chip but is encoded. The SET protocol is preferably an encryption algorithm on the chip where part of the initial data would be the cardholder's PCC 20 number. The algorithm could be decoded by the card provider 3 but not by the merchant 2 to come up with the real account number. In one embodiment, the merchant 2 routes the authorization to the card provider via a BIN number rather than the PCC 20 number. When the transaction is sent from the merchant 2 to the card provider 3 for authorization, the CAS 7 preferably triggers the decode algorithm to complete the process, linking the STN 15 to the PCC 20 account.

Another embodiment contemplates the use of the STN 15 with a transponder system comprising a first means for generating or storing a signal that includes an encoded STN 15 and a second means for reading or receiving the signal. In an exemplary embodiment, a cardholder 1 waves a small transponder unit in front of the merchant's 2 receiving unit. The STN 15 information can be sent/received by a number of known methods (e.g. optical, magnetic, infrared, radio frequency, etc). The merchant 2 reader captures the STN 15 and forwards the STN 15 (with the associated transaction information) to the card provider's CAS 7 as previously described. The transponder units may be set up in a number of ways. Each transponder device may hold one STN 15 with certain predefined parameters or each transponder device may have several STNs 15.

Referencing FIGS. I and II, after the secondary transaction number (STN 15) is provided to the merchant 2, the merchant 2 submits an authorization request to the card provider 3, as it would with any other credit card transaction. This request is routed to a card authorization system (CAS) 7 for authorization (step 80). The CAS 7 recognizes the transaction as involving a STN 15 and forwards the transaction information to the Authorization Request Listener 77 program on the application server 5 (step 81). The Authorization Request Listener 77 passes the transaction information to a CAS Authentication Component 78 (step 82). The CAS Authentication Component 78 determines if use of the STN 15 has satisfied the previously defined conditions of use parameters. To determine this, the CAS Authentication component 78 looks to the STN database 6 for the conditions-of-use rules and the primary charge card number (PCC 20) that are associated with the particular STN 15 (step 83). If the use of the STN 15 complies with the rules of use, the CAS Authentication component 78 returns an authorization message and the associated PCC 20 to CAS 7 (step 84). CAS 7 then performs an authorization request for the PPC 20, as is typically done with any physical charge card, to ensure that the primary charge card conditions (e.g., credit limit, expiration date, etc.) have been met.

If CAS 7 authorizes use of the PCC 20, the transaction involving the STN 15 is approved and an approval code will be generated. However, the PCC 20 must first be replaced with the STN 15 and the STN database 6 must be updated to reflect this transaction data. This is accomplished by CAS 7 returning to the CAS Authentication component 78 an approval message with the transaction data (step 85) and CAS Authentication component 78 forwarding to a reversal processing engine 79 (step 86). The reversal processing engine 79 interfaces with the STN database 6 to re-substitute the STN 15 for the PCC 20 and also to update the STN database 6 to reflect the transaction information (step 87). For example, if the conditions of use parameters associated with the STN 15 authorized two transactions, this step 87 updates the cardholder account in the STN database 6 to reflect that only one transaction remains. The reversal engine 79 substitutes the PCC 20 with the STN 15 and forwards to CAS 7 (step 88). CAS 7 then provides the results to the merchant 2 (step 89). If the CAS Authentication Component 78 does not authorize use under the STN 15 conditions or if CAS 7 does not authorize use under the PCC 20 conditions, the transaction will not be approved. When the use conditions of both the primary charge card and the secondary transaction numbers are satisfied, the transaction is approved. In this preferred embodiment, however, the STN 15 is not deactivated to prevent settlement. To the contrary, settlement may proceed (as discussed next) even when an authorization was declined.

Additionally, use of other third party networks and systems are contemplated by the present system. One exemplary system allows a card provider 3 to associate STNs to third party accounts, offering the same fraud reduction benefits to external card issuers. Here, in this exemplary system for authorizing STN, a merchant 2 submits an authorization request to a card provider 3. CAS 7, recognizing the STN 15 forwards the request to application server 5. The conditions of use are checked and the authorization request is modified to substitute the STN 15 with the associated primary account (PCC 20). In some cases a merchant identifier may be included in the authorization request. Therefore a translation may occur to substitute the card provider 3 merchant ID with the corresponding third party card issuer merchant ID. The request is then returned back to CAS 7 for a normal authorization. CAS 7 then recognizes the account as originating from another issuer (third party issuer 92), forwards the authorization request to a third party issuer's network for processing (step 84*a*). The network 91 routes the request to the appropriate third party issuer 92 for an authorization determination. The third party issuer 92 processes the authorization request and returns the result to CAS 7 for forwarding back to application server 5 (step 84*b*). Application server 5 saves the authorization result (approval or denial) and substitutes the PCC 20 with the STN 15 and returns to CAS 7 for forwarding to the merchant 2.

The authorization and settlement processes may occur as separate steps or as a single step. In one embodiment, referred to herein as an electronic data capture (EDC) system, the merchant 2 sends an authorization request and if the authorization request is approved, a receipt of charges is created and submitted for the merchant 2. Separate sequences of file transmissions or messages are therefore not required. Various embodiments, hybrids, and modifications of these processes should be apparent to one skilled in this art.

Prior art systems typically deactivate a temporary transaction number during the authorization process if limited-use conditions are not met. As previously explained, because of the uncertainty and variability of the authorization processing, this often results in a transaction numbers being unintentionally deactivated, thereby bringing the transaction processing to a sudden halt. An exemplary embodiment of the present invention overcomes this problem by not "deactivating" the secondary transaction number when predetermined conditions are not met. But instead, allowing the transaction to proceed through settlement, albeit without a valid approval code, where the merchant bears the risk that the amount will later be charged back by the card provider 3 if the transaction is disputed by the cardholder 1.

An exemplary settlement process of this invention involves the backend systems shown in FIG. 8. Specifically, referencing FIGS. 1 and 8, the backend process utilizes a financial capture system (FINCAP) 10 to capture the settlement information (e.g., receipt of charges "ROC" and summary of charges "SOC") from the merchant 2, a backend application service 8 to ensure that proper account information is processed, an accounts payable system 9 to pay the merchant 2, and an accounts receivable system 11 to process the account statement that is provided to the cardholder 1. An exemplary embodiment of the settlement process involves a settlement request being made by a merchant 2 for a transaction involving a STN 15. All settlement requests are forwarded to the card provider's back end system 14 for processing where the request is initially sent to FINCAP 10. FINCAP 10 captures the ROC and SOC data and identifies, via the card product identifier (or by any other suitable means), the transaction as involving a STN 15. In another embodiment, the product identifier (or BIN number) does not differentiate between a STN 15 and a regular charge card number. In that instance, it will be necessary for FINCAP 10 to call the backend application service 8 (which interfaces with the STN database 6) to identify the STN 15 from other charge numbers. After the STN 15 is distinguished from the ordinary physical charge cards, FINCAP 10 verifies that the number is valid (i.e., exists in the STN database 6). If the STN 15 is a valid number, FINCAP 10 creates a payment (accounts payable) file including the transaction data and sends a payment message to the AP system 9 instructing the merchant 2 to be paid. In paying the merchant 2, the card provider 3 references only the STN 15 and does not release the PCC 20 or any other regular charge card numbers.

The back-end system 14 processes the cardholder 1 STN account information as follows. After capturing the transaction information (ROC and SOC) from the merchant 2, FINCAP 10 creates a cardholder account (accounts receivable) file and sends a message to the back-end application service 8 to process the information for cardholder billing. Recognizing that the transaction involves a STN 15, the back-end application service 8 replaces the STN 15 with the PCC 20, updates the cardholder STN account information in the STN database 6 to reflect the appropriate transaction settlement information, and processes the transaction as with any other transaction. The backend application service 8 sends the transaction details to the AR system 11, where the AR system 11 sends the proper statement to the cardholder 1, typically referencing only the PCC 20 number. In another embodiment, the AR system 11 may process the statement where the transactions are further categorized and itemized by both the PCC 20 number and the STN 15.

As previously noted, it may often be the case with prior art systems that the temporary transaction number is inadvertently deactivated during the authorization phase and completion of the transaction is not possible. e.g., multiple payment purchases. The present transaction system overcomes this problem by ensuring that valid transaction numbers will be processed. If the conditions-of-use parameters are not met, the cardholder 1 is, under an exemplary embodiment of the present system, able to dispute the transaction and have the transaction charged back to the merchant 2 during the dispute handling process (discussed next). During this dispute handling phase, the card provider 3 will retrieve information from the STN database 6 to determine if the disputed information was "authorized", i.e., has an associated approval code. If the transaction was not "authorized" because the conditions of use parameters were not satisfied, the amount will be charged back to the merchant 2 according to predefined business rules.

Another embodiment provides for checking the approval codes and other conditions during settlement. Here, transaction information (approval code, SE number, or other information) may be checked during settlement. For example, the backend application service 8 (or the application server 5) may compare transaction information to a business rule or conditions set associated with a cardholder 1 STN account. If conditions of use have not been met or if a valid approval code is missing, the service 8 or server 5 may cause a charge back to be issued to the merchant to offset the previous merchant payment. In other words, in this alternative embodiment, where an STN 15 transaction is processed through settlement, the following events may occur in sequence. First, a payment file is established once it is determined that the STN 15 is a valid number. Second, the merchant is paid. Third, the system applies the business rules or conditions for the particular account associated with the STN 15. Fourth, if it is determined that the merchant 2 should not have been paid in the first instance because the transaction conditions were not met or an approval code was not present, the system will execute a charge back to the merchant 2. This settlement processing may be transparent to the cardholder 1 since, before the AR system releases a cardholder billing statement, the merchant is paid and then charged-back resulting in no outstanding balance to the cardholder 1.

As shown in FIG. 8, the present invention contemplates the interaction of clearing and settlement systems other than those of the card provider 3. This exemplary system allows a card provider 3 to clear and settle STN transactions where an STN 15 is associated to a third party account, meaning that the merchant 2 is paid and the charge is billed to the cardholder 1. As such, an exemplary embodiment of the present invention is configured to support interaction with third party networks and systems. Here, the backend application service 8, upon receiving a STN 15, recognizes that the associated PCC 20 originated with another card issuer 92. The backend service 8 separates the transaction into two transactions (a clearing transaction and a settlement transaction). A substitution occurs in the clearing transaction where the STN 15 is replaced by the associated PCC 20. Also, a translation may occur to substitute the card provider 3 merchant ID with the corresponding third party card issuer ID. The transactions are then forwarded to a third party clearing and settlement network 93. The third party clearing and settlement network 93 handles the routing, as appropriate, to a merchant acquirer's accounts payable system 91 and an issuer's accounts receivable system 92. As noted above, the accounts payable system ensures that all correspondence with the merchant 2 references the STN 15.

The dispute handling process of the present invention involves situations where a cardholder 1 or merchant 2 disputes charge that is associated with a transaction involving a STN 15. Generally, a cardholder 1 disputes a charge by contacting the charge card provider 3 via phone, mail, or internet. As previously noted, an exemplary AR system 11 typically bills the cardholder 1 with reference to only the PCC 20 number. The computer systems of the present invention allow the card provider's customer service representatives to lookup information based on, inter alia, the STN 15 or the PCC 20 number. FIG. 12 depicts an exemplary look-up screen 175 for reviewing the primary charge card account 20 and the transactions associated with the STNs 15.

With respect to a cardholder initiated dispute, the representative initiates a dispute through a dispute handling system (DHS) to obtain the case avoidance or case set rules for cardholder disputed transactions. One of the case avoidance or case set rules provides for a look up from the STN database 6 to verify that the transaction was processed with an approval code. The rule set may provide for, inter alia, an automatic charge back of the transaction amount to the merchant if an STN 15 transaction is submitted without an approval code. The DHS or the representative initiates a cardholder 1 or merchant 2 contact (via phone, mail, internet). Disputes involving STNs 15 may be automatically routed to predefined STN queues based on industry type (i.e., airline, car rental, etc). Contact letters may be automatically filled with information retrieved from the STN database 6. The adjustment file accesses the application server 5 (or backend application service 8) to substitute the PCC 20 number with the STN 15. A letter file is then generated and an electronic transmission system routes electronic contacts to and from various merchant interfaces.

In an exemplary system for handling disputes from merchant 2, a merchant 2 contacts the card provider 3 via normal channels. The card provider's representative generally accesses a customer service application that is used to service merchants. This customer service application identifies the account by a STN 15 in dispute. A case is set-up with the STN 15 and is managed via adjustment management systems. The adjustment management system and a letter generating system access the STN transaction system 18 for the account number swap, where the PCG 20 number is replaced with the STN 15 for financial adjustments intended for the cardholder 1. The remaining inquiry is processed as with existing dispute handling systems.

Although the previously described embodiments generally relate to a cardholder's 1 request for a STN 15, the merchant 2 may also find it desirable to request secondary transaction numbers from the card provider 3 in order to limit exposure to credit card fraud. In traditional transaction processes, upon completing a transaction, the merchant 2 stores transaction information (including the customer's credit card number) in a merchant database. This database of information is subject to credit card fraud in that a thief could hack into the merchant's computers to steal its customer's credit card numbers. To limit exposure, the merchant 2 may desire to replace those customer credit card numbers with STNs 15 that are associated with the cardholder's primary credit card number (e.g., PCC 20), i.e., the merchant may not want its database filled with actual customer credit card numbers. In this situation, only the card provider 3 maintains the actual credit card number and the merchant 2 retains only the STN 15. In an exemplary process, the merchant receives a regular credit card number from a cardholder 1 to facilitate a transaction. The merchant 2 submits the number to a card provider 3 for authorization, requesting that the card provider 3 instead of returning the regular credit card number, return a STN 15 (and approval code) that is associated with the regular credit card. In response, the card provider generates a STN 15, associates the number to the regular credit card number (which becomes the primary account (e.g., PCC 20)), checks to see if authorization is appropriate and returns the authorization record (only referencing the STN 15) to the merchant 2. The merchant 2 processes the transaction through the normal settlement channels, referencing the STN 15 instead of the regular credit card number. When retaining transaction records, the merchant 2 replaces the primary credit card number with the STN 15 and maintains the STN 15 in its database.

In another embodiment, the merchant 2 accepts only STNs 15—not regular credit card numbers—from cardholders to complete transactions. For the same reasons stated above, the merchant 2 may desire to limit receipt of regular charge card numbers to limit exposure to credit card fraud. In one exemplary embodiment, the merchant 2 computer system differentiates between STNs and regular charge card numbers and will not allow customers to use regular charge card numbers to facilitate a transaction (i.e., will refuse the transaction). As previously described, however, the STN 15 and the regular charge card may be transparent to the merchant 2 making it difficult for the merchant 2 to differentiate between the STN 15 and the regular charge card. In this situation, in an exemplary embodiment, the STN 15 will be identified during the authorization process by the card provider 3, where if the STN 15 does not meet certain conditions defined by the merchant 2, the transaction will not be authorized. For example, the merchant could require that all customer transactions be completed with a STN 15 that has limited-use conditions restricting use to the amount of the transaction or restricting use to the particular merchant. During the authorization process, the STN 15 is compared with the merchant-defined conditions where if the conditions are not satisfied, the authorization request will be denied. After completion of the transaction, and upon satisfying the merchant 2 conditions, the STNs 15 have little to no value and would be of minimal value to a potential thief. Several additional embodiments of the transaction system are provided below.

In one embodiment, the STN database 6 is used to facilitate the merging of a newly acquired cardholder base with an established cardholder base. For example, when a bank or other institution sells a cardholder base to a card provider 3, the card provider 3 creates new physical accounts for the acquired cardholders and does not issue new cards. The STN database 6 is updated to associate the acquired cardholder account numbers to the newly created accounts. This allows the cardholders' existing physical cards to still be used and processed appropriately. The card provider (BIN) routing is modified for the acquired accounts so authorization requests and settlements are sent to the card provider 3 instead of to the bank or other institution. CAS 7 and FINCAP 10 recognize these acquired accounts as STN 15 accounts and translate the numbers appropriately. The end result is that charges made by the acquired cardholders end up on a statement generated by the card provider 3.

In another exemplary embodiment of the transaction system, a card provider 3 may provide a line of credit to a customer or to a merchant 2 or group of merchants who can private label for use by their customers. This allows the merchant 2 to provide a branded line of credit with minimal or no changes to the credit card authorization and settlement process. In one embodiment, the merchant 2 approves a line of credit or asks the card provider 3 to approve a line of credit for the customer. The card provider would then issue a STN 15 to the customer via the merchant 2. This STN 15 is generally used with the merchants 2 who are issuing the line of credit. When the customer wants to make a purchase using the merchant's line of credit, the merchant forwards a standard credit request to the card provider 3 with the STN 15 used as the credit card number in the transaction protocol. The card provider 3 verifies that the line of credit is authorized and was submitted by the merchant 2 issuing the line of credit associated with this STN 15. The card provider transaction system (via the STN transaction system 18) is capable of denying usage of this line of credit at another non-participating site. The card provider 3 may provide a private label or co-branded web, site to apply for the line of credit. The card provider's back end system 14 then bills the customer and pays the merchant. The merchant 2 may keep the electronic line of credit privately at their site, or provide it to the customer. The authorization system would not authorize usage at other sites.

Figure 13:
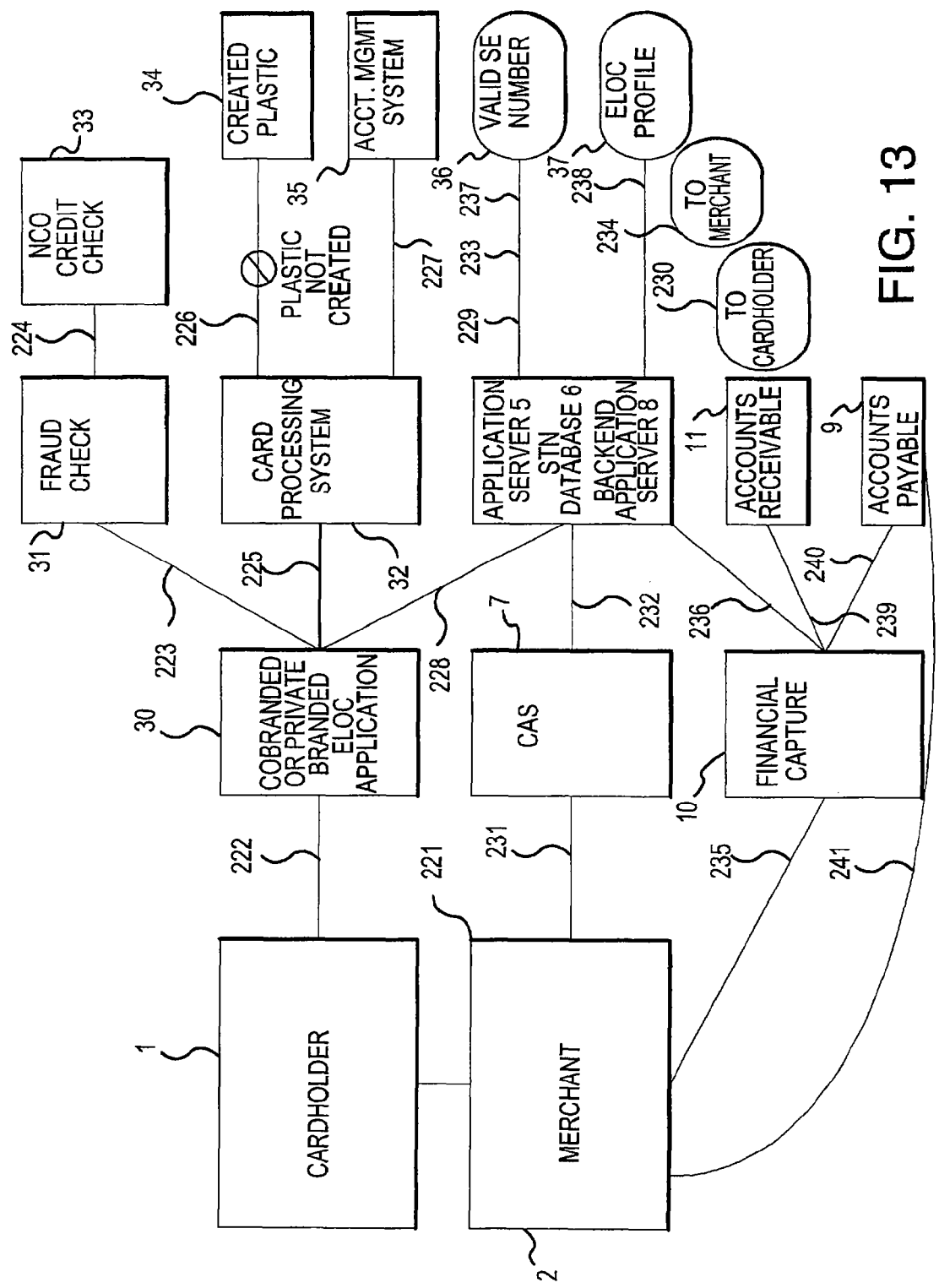
FIG. 13 is a flow diagram depicting an exemplary embodiment of the present invention involving an electronic line of credit system.

FIG. 13 depicts an exemplary transaction process for use in providing lines of credit to merchants 2. A cardholder 1 or customer (who may or may not be an existing card member of the participating card provider 3) applies for an electronic line of credit (ELOC) with a merchant 2 (step 221), the merchant 2 redirects the cardholder 1 to the card provider's 3 website to fill out the ELOC application 30 (step 222). A fraud check 31 is performed (step 223) and a credit inquiry is typically performed by any credit bureau company 33 (step 224). If a card processing system 32 determines that credit is acceptable, an account is set up (step 225). A physical card 34 is not generated as with typical processes and may need to be purged depending on the particular system set-up (step 226). The account is sent to the account management system 35 (step 227) and then forwarded to the STN database 6 and the application server 5 (step 228). The cardholder 1 account is then related to a valid merchant identification number such as the SE number 36 (step 229). An account is then set-up with a ELOC profile 37 and at this point the secondary transaction ELOC number is passed back to the cardholder 1 (step 230). The merchant 2 submits the ELOC payment request to CAS 7 (step 231), and CAS 7 routes the ELOC to the STN system (step 232), where the STN system verifies that the SE number is approved for this particular ELOC (step 233). The STN system translates the ELOC STN to the related account in the account management system and returns the ELOC STN to merchant (step 234). The merchant is then required to submit the authorization code with the receipt of charges (ROC) and summary of charges (SOC). The merchant submits the ROC and/or SOC to the card provider's FINCAP 10 (step 235), whereupon FINCAP forwards the ELOC to the STN system (step 236). The STN system verifies that (i) this SE number is valid for the particular ELOC account (step 237) and (ii) the particular transaction was authorized for the specific ELOC account (step 238). The STN system then flips the card number, returns it to FINCAP 10, whereupon, the number is forwarded to the card provider's accounts receivable system 11 (step 239). FINCAP forwards the ELOC STN and associated information to the Accounts Payable system 9 (step 240) and pays the merchant 2 (step 241).

Another exemplary embodiment allows a cardholder to find an online digital wallet with the secondary transaction number. In this embodiment, after generation and association with the primary charge card, the secondary transaction number is provided to the cardholder to use within a designated digital wallet, which may reside locally at the cardholder's computer or may be stored in an online password protected account.

In yet another alternative embodiment, the secondary transaction system may be used to facilitate programs involving non-currency tender, such as the American Express® Membership Rewards as Currency™ system that is detailed in U.S. Provisional Application No. 60/200,492, filed on Apr. 28, 2000, and U.S. Provisional Application No. 60/201,114, filed on May 2, 2000, which are hereby incorporated by reference. One embodiment of this system, depicted in FIG. 14, allows a cardholder 1 to create a STN 15 to be used to spend membership rewards points. In general, a membership or incentive rewards program is a loyalty program that rewards cardholders for using their charge card to make purchases. Cardholders accumulate points by using a participating charge card or by purchasing products at a participating merchant. These points may then be converted to a monetary value and redeemed to purchase merchandise.

Figure 14:
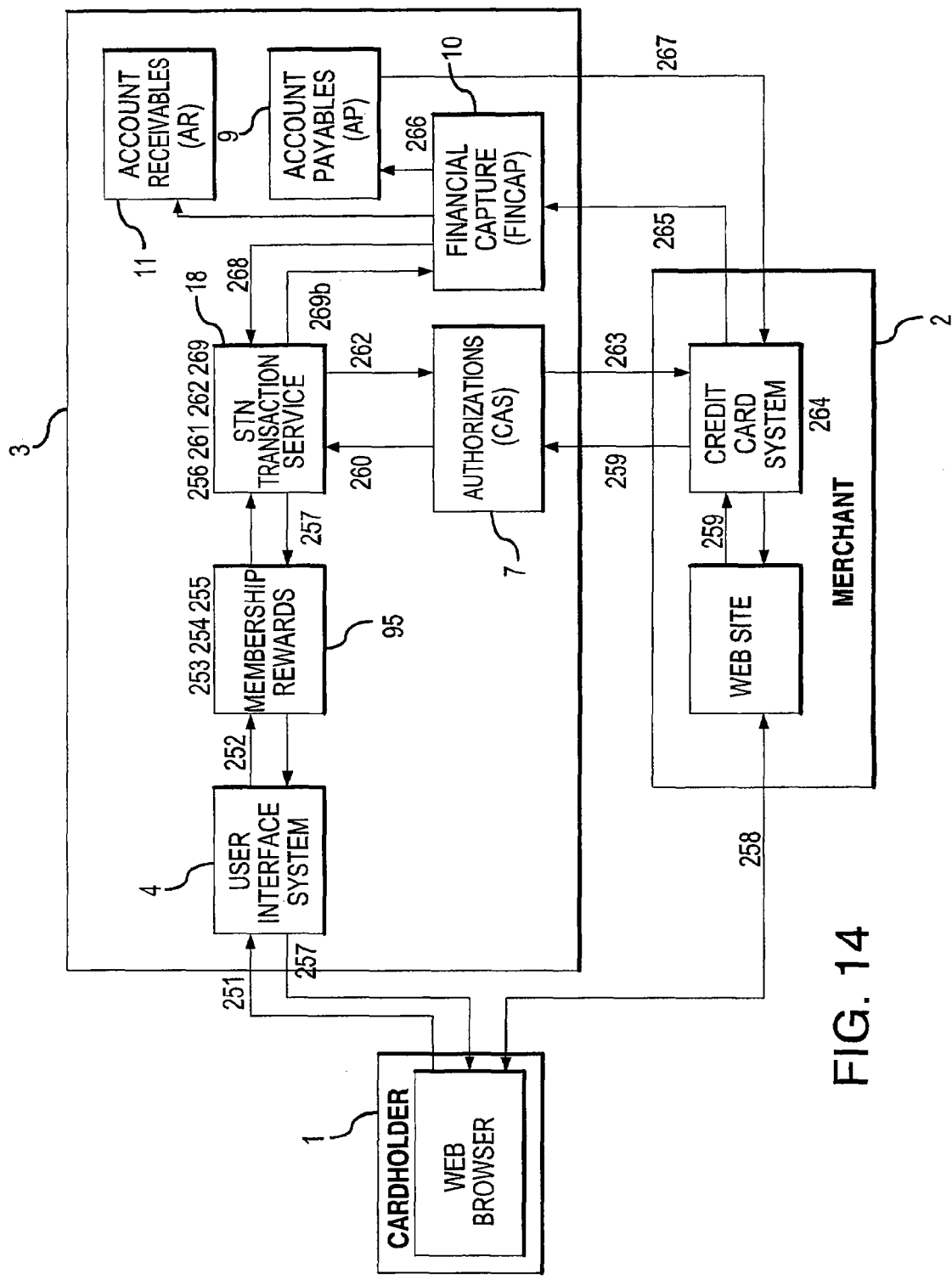
FIG. 14 is a flow diagram depicting one embodiment of an exemplary transaction system of the present invention used to facilitate a non-currency based membership rewards program.

As depicted in FIG. 14, a cardholder 1 accesses and logs onto the card provider's services via a user interface system 4 (e.g., an internet connection) (step 251). The cardholder 1 proceeds (clicks on hyperlink) to the membership rewards (MR) system 95, where she indicates that she would like to use her membership reward points that are available in her MR account (step 252). The MR system 95 reports to the cardholder 1 how much the available MR points are worth (step 253). The cardholder 1 indicates how many of the MR points (converted to monetary value) should be loaded info an account that can be used for purchases (step 254). In an exemplary embodiment, the STN 15 can be associated with a MR account, i.e., a primary charge card account that is funded with these MR points. Use of this MR account may be limited by the cardholder 1 or the card provider 3, or could be further limited by the MR system rules of use that may have been predefined by participating merchants (step 255). Once the MR system 95 has approved the request and allocated the requested MR points, the STN system 18 associates a STN 15 and establishes an MR-STN 15 profile (256). The MR-STN profile contains the options that will be applied and the amount that will be available to the resulting STN 15. The STN system 18 returns the STN 15 (and other account information) to the MR system 95 to provide to the cardholder 1 for use in completing subsequent transactions (e.g., online purchases) (step 257).

When desiring to purchase products using the MR point-funded STN 15, the cardholder 1 proceeds to a merchant site (e.g., online website), selects goods and is requested by the merchant to provide payment information (e.g., via an online payment web page). The cardholder 1 chooses the appropriate card provider 3 as the form of payment (e.g., American Express®, Visa®, etc.) and enters the STN 15 (and other needed information) into the appropriate payment fields (step 258). The merchant processes the STN 15 authorization as discussed above (step 259), where the card provider CAS 7 recognizes the transaction as involving a STN 15, and forwards the request to the STN system 18 containing, inter alia, an application server (FIG. 8, number 5) and a STN database (FIG. 8, number 6). It should be appreciated that profile information may be stored in a MR database, STN database 6 or any other suitable database (step 260). The STN system 18 recognizes the account as a MR account, and verifies that optional conditions, if any, are met. If the conditions are not met, an error is returned to CAS 7 and then to the merchant (step 261). If the conditions are met, the balance available on the MR-STN profile is reduced by the purchase amount, a record of the purchase is recorded in the MR-STN profile, and an approval code is returned to the authorization system (step 262) and then to the merchant (step 263). Although additional CAS 7 processing is contemplated by this embodiment, application of additional rules and validations—which would typically be applied—are not required for this type of account. The approved purchase is finalized by the merchant with the STN 15 transaction being submitted through the merchant's existing POS network for settlement (step 264). The STN 15 transaction is received by the card provider's financial capture system (FINCAP) 10 (step 265). The FINCAP 10 forwards the STN transaction to the appropriate AP system 9 (step 266). The AP system 9 then pays the merchant according to the appropriate settlement terms and conditions (step 267). The FINCAP 10, having identified the transaction as involving an STN 15, sends the transaction information to the STN system 18 (via a backend application service 8) to identify the actual account number (i.e. PCC 20) (step 268). The STN system 18 recognizes that the STN 15 is associated with a MR account, searches for the MR-STN profile and passes a credit request to the appropriate cardholder 1 MR account to reduce the available MR points (step 269), and (ii) the transaction record is used to build a credit against the actual charge card account (e.g., PCC 20) that will offset the charged STN 15 transaction (step 269*b*). In the first instance (step 269), the STN system 18 passes a request to the MR system 95 to deduct the appropriate number of MR points. In the second instance (step 269b), both the original transaction and the credit are passed back to FINCAP 10 with the actual charge card account number (e.g., PCC 20 number). The FINCAP 10 then forwards the charge and credit transactions to the appropriate AR system 11 for normal billing processing.

As shown, the embodiment depicted in FIG. 14 allows the cardholder 1 to spend the MR points in at least two ways. First, the membership reward points can be deducted at the time of the transaction processing, or second, the transaction can be reflected on the cardholder's bill along with an associated credit that reflects the payment with reward points. It should also be appreciated that a cardholder 1 may choose to use MR points on a transaction by transaction basis, and preferably, is able to combine variations of currency (e.g., credit, debit cards etc.) and non-currency tender (MR points), as desired, to effectuate a transaction. Additionally, both currency and non-currency tender may be integrated into a STN gift, where a first party gifts to a second party a secondary transaction number that has some currency or non-currency value.

Another membership rewards embodiment is shown in FIG. 15. Here, the cardholder 1 is able to choose to use membership reward points when shopping at a merchant 2 site that supports the membership rewards as a payment option. Referencing FIG. 15, the cardholder 1 goes to a participating merchant's site (e.g., online website) to shop for goods or services. The cardholder 1 selects merchandise and continues to a payment site, where the card provider's MR points is one of the payment options (step 301). When the cardholder selects this option, a secure connection is established with the card provider 3 that authenticates both the cardholder 1 and the merchant 2 (step 302). The card provider 3 requests the cardholder's user ID and Password, either through a pop up screen, a http redirect link, or an applet downloaded by the merchant (step 303). The cardholder 1 supplies the User ID and Password which is returned to the card provider with the purchase amount (step 304). The card provider user interface 4 (e.g., online services) causes the cardholder 1 to be authenticated, collects the associated registered card accounts and invokes the MR system 95 (step 305). The MR system 95 uses these card accounts to identify the cardholder's MR account (step 306). If none of the registered accounts are related to a MR account, the cardholder 1 is not able to use MR points to pay for her purchase and an error is returned to the cardholder 1. After identifying the MR account, the MR points available are converted to the corresponding cash equivalent and compared to the purchase amount being requested. If the purchase amount is greater than the MR cash equivalent, an error is returned to the cardholder 1 (step 307). If the MR cash equivalent is greater than the purchase amount, all card accounts participating in the MR account are collected and returned to the cardholder 1 (step 308). The cardholder 1 designates the card account to be used to house all succeeding financial activity, which is then returned to the card provider 3 (step 309). The card provider 3 then triggers the STN system 18 to establish a STN 15 that is associated to the selected MR account number and a MR-STN account profile is set-up (step 310). The STN system 18 returns the STN 15 to the User Interface System 4 and then onto the cardholder 1 (step 311), The cardholder 1 cuts and pastes, drags and drops, or auto-fills the STN 15 (and needed information) onto the appropriate merchant payment field (step 312).

As previously noted, the merchant uses the existing authorization network to request authorization for the STN transaction (step 313). The CAS 7 recognizes the transaction as one involving a STN 15 and forwards to the STN system 18 (step 314). The STN system 18 identifies the associated actual account number (e.g., PCC 20 number) for the STN 15 (step 315) and also recognizes the account as a MR account. At this point, although all MR transactions would have been previously verified, the MR account balance is again checked to minimize possible fraud (e.g., fraud involving two requests using the same MR points). The cash equivalent for the MR points for the actual account are then retrieved from the MR system 95 and if the purchase amount is greater than the available amount, a denial is returned to the authorization system and to the merchant 2 (step 316). If the cash equivalent value of the MR points exceeds the purchase amount, the STN system records the purchase in the MR-STN profile and returns the STN 15 to the CAS 7 (step 317). The CAS 7 then completes the authorization for the actual account (e.g., ensuring that the limits for the PCC 20 are complied with) (step 318), and returns the results (e.g., approval code) to the merchant 2 (step 319).

The approved transaction is finalized by the merchant 2 with the STN transaction being submitted through the existing point of sale network for settlement (step 320). As before, the transaction information is received by the card provider FINCAP 10 (step 321) and then forwarded to the appropriate AP system 9 (step 322) for payment (step 323). Since the transaction involves a STN 15, FINCAP 10 directs the transaction to the STN system 18 to identify the PCC 20 (step 324). The STN system 18 identifies the PCC2O (step 325) and also recognizes the STN 15 account is set up using MR points, where the STN system 18 searches the MR-STN profile for the associated purchase record (step 326). The STN system either (i) passes a credit request to MR to reduce the MR points (step 326a), or (ii) creates a credit against the billing transaction (step 326b). In step 326a, the STN system 18 passes a request to the MR system 95 to deduct the appropriate number of MR points. Here it is not necessary to return the AR transaction information to FINCAP for forwarding to the AR system 11, but a reconciliation entry is created to reconcile the AR for FINCAP 10. In step 326b, a transaction record is used to build a credit against a real account number (e.g., PCC 20) that will offset the charge transaction. The STN system 18 forwards this credit to the FINCAP 10. The original billing transaction is returned to the FINCAP to appear on the cardholder's 1 statement. The FINCAP 10 then forwards the charge transaction to the appropriate AR system for normal processing. The FINCAP 10 forwards the credit issued by the MR system 95 to the appropriate AR system 11 for normal billing processing. Accordingly, the cardholder 1 will see on her statement a credit reflecting the currency value of the MR points used and a charge in the amount of the transaction.

Another embodiment provides for the generation of one or more STNs that are subordinate to and associated with a main secondary transaction number that, as described above, is associated with the cardholder's PCC 20 account. As noted above, these subordinate numbers may also be digitally stored in devices such as wireless telephones, PDAs, handheld computers, and the like. Providing multiple layers of secondary transaction number provides the cardholder 1 with greater flexibility. For example, a cardholder on vacation could structure the main STN 15 to be valid for the duration of the vacation. The cardholder 1 is then able to generate subordinate secondary transaction numbers (or tertiary numbers) with varying preferences to take into account various activities that may occur during the vacation. A cardholder 1 could structure the main secondary transaction number to have a maximum credit limit of $3,000 (this assumes that the associated primary charge card credit limit is equal to or greater than $3,000) that is good for the duration of the vacation. A subordinate secondary transaction number may then be provided to the spouse with a $1,000 limit and additional secondary transaction numbers, restricted to $500 limits, could be provided to the children. Each subordinate card would be valid only for the duration of the vacation and would only be valid for the maximum dollar amount specified.

Figure 16:
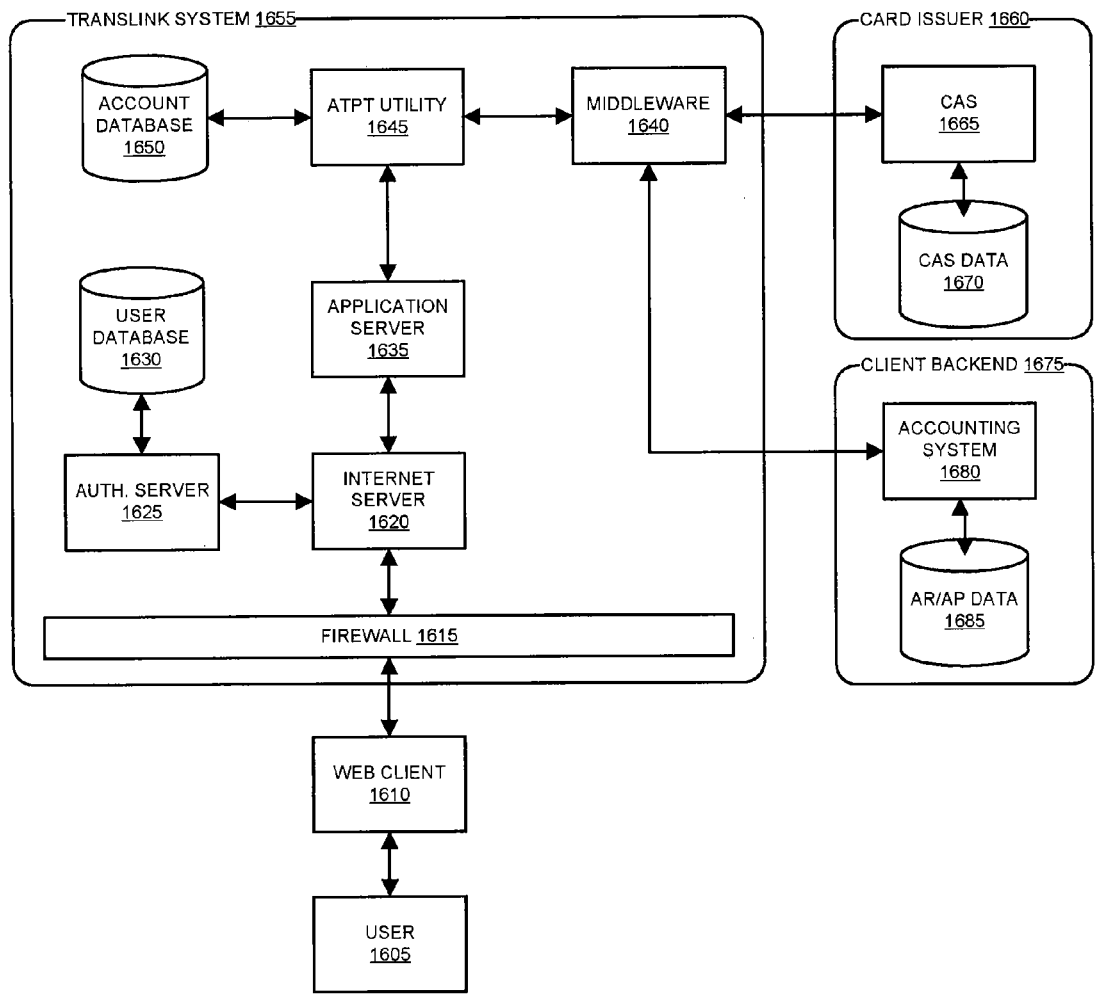
FIG. 16 is a block diagram illustrating the major exemplary system components for automatically reconciling, according to an embodiment of the present invention.
Figure 17:
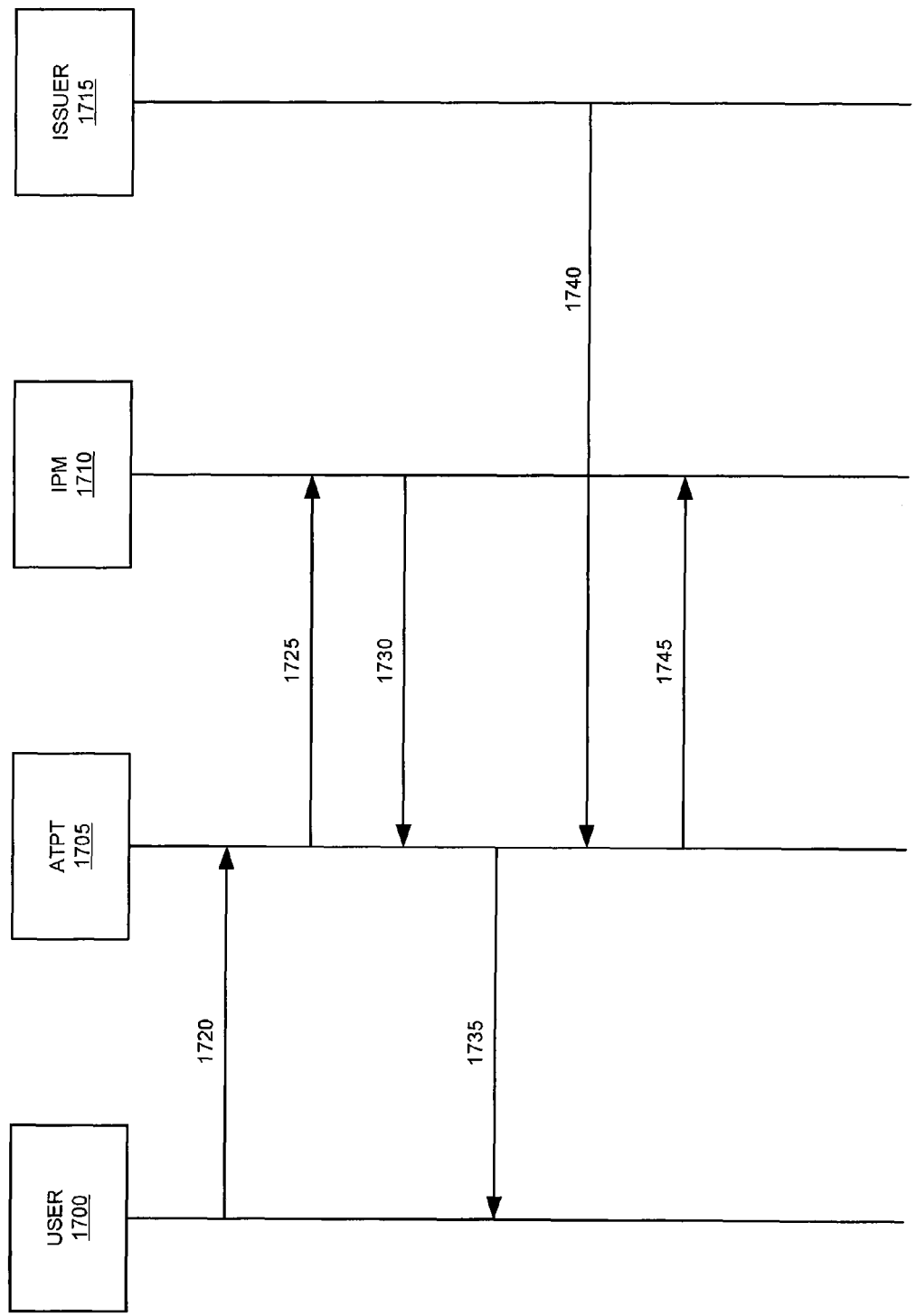
FIG. 17 is an exemplary overview process diagram for automatic reconciliation of card transactions, according to an embodiment of the present invention.

With reference to FIG. 16, system 1600 facilitates interaction between a user 1605 and the Translink System 1655 through, for example, a web client 1610 with a network connection to an internet server 1620. Internet server 1620 may employ an authentication server 1625 in order to validate and assign proper permissions to authorized users of Translink System 1655. User database 1630 stores user credentials and permissions specific to each user. Internet server 1620 also employs an applications server 1635 to manage various applications and utilities that are utilized by the system. Application server 1635 may be a stand-alone server or may comprise software residing within intranet server 1620. ATPT (automated transaction processing tool) utility 1645 is invoked by application server 1635 to interact with account database 1650, card issuer system 1660, and client backend systems 1675. ATPT utility may further perform data conditioning and formatting for presentation to user 1605 and for exchange between disparate computing systems. Account database 1650 maintains data pertaining to active account numbers. While not shown, application server 1635 may further interface with a report engine to create pre-configured and/or ad-hoc reports as will be discussed herein.

In addition to the components described above, Translink System 1655 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: user database 1630; account database 1650; CAS database 1670; AR (accounts receivable)/AP (accounts payable) database 185, and/or like data useful in the operation of system 1600.

As will be appreciated by one of ordinary skill in the art, one or more of the components of system 1600 may be embodied as a customization of an existing system, an add-on product, upgraded software, a stand alone system (e.g., kiosk), a distributed system, a method, a data processing system, a device for data processing, and/or a computer program product. Accordingly, individual system 1600 components may take the form of an entirely software embodiment, an entirely hardware embodiment, or an embodiment combining aspects of both software and hardware. Furthermore, individual system 1600 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The invention contemplates uses in association with loyalty, incentive or reward programs, web services, utility computing, pervasive and individualized computing, security and identity solutions, autonomic computing, commodity computing, mobility and wireless solutions, open source, biometrics, grid computing and/or mesh computing. For example, in an embodiment, the transaction device, reader, and/or transaction device-reader system are configured with a biometric security system that may be used for providing biometrics as a secondary form of identification. The biometric security system may include a transaction device and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof. For an explanation of systems and methods for providing a secondary form of identification for transaction completion, please see U.S. patent application Ser. No. 10/708,822, titled "SYSTEM FOR BIOMETRIC SECURITY USING A FOB," filed Mar. 26, 2004; and U.S. patent application Ser. No. 10/708, 823, titled "METHOD FOR BIOMETRIC SECURITY USING A TRANSPONDER," filed Mar. 26, 2004, which are hereby incorporated by reference.

User 1605 may include any individual, business, entity, government organization, software and/or hardware that interact with system 1600 to request account numbers, assign descriptors to account numbers, define account number constraints, and/or the like. User 1605 may be, for example, a program manager who interacts with system 1600 to request transaction account numbers for specific use by an employee of the corporation. User 1605 may interface with Internet server 1620 via any communication protocol, device or method discussed herein, known in the art, or later developed. In one embodiment, user 1600 may interact with Translink System 1655 via an Internet browser at a web client 1610.

Web client 1610 comprises any hardware and/or software suitably configured to facilitate input, receipt and/or review of information relating to account numbers or any information discussed herein. Web client 1610 includes any device (e.g., personal computer), which communicates (in any manner discussed herein) with Translink System 1655 via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 1610 may or may not be in direct contact with Translink System 1655. For example, web client 1610 may access the services of Translink System 1655 through another server, which may have a direct or indirect connection to intranet server 1620.

As those skilled in the art will appreciate, web client 1610 includes an operating system (e.g., Windows NT, 95/98/2000, OS2, UNIX, Linux, Solaris, MacOS, etc.) as well as various conventional support software and drivers typically associated with computers. Web client 1610 may include any suitable personal computer, network computer, workstation, minicomputer, mainframe or the like. Web client 1610 can be in a home or business environment with access to a network. In an exemplary embodiment, access is through a network or the Internet through a commercially available web-browser software package.

Web client 1610 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network.

Firewall 1615, as used herein, may comprise any hardware and/or software suitably configured to protect Translink System 1655 components from users of other networks. Firewall 1615 may reside in varying configurations including Stateful Inspection, Proxy based and Packet Filtering among others. Firewall 1615 may be integrated as software within intranet server 1620, any other system components or may reside within another computing device or may take the form of a standalone hardware component.

Internet server 1620 may include any hardware and/or software suitably configured to facilitate communications between web client 1610 and one or more Translink System 1655 components. Further, Internet server 1620 may be configured to transmit data to web client 1610 within markup language documents. As used herein, "data" may include encompassing information such as commands, queries, files, data for storage, and/or the like in digital or any other form. Internet server 1620 may operate as a single entity in a single geographic location or as separate computing components located together or in separate geographic locations.

Internet server 1620 may provide a suitable web site or other Internet-based graphical user interface, which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Application server 1635 may include any hardware and/or software suitably configured to serve applications and data to a connected web client 1610. Like Internet server 1620, application server 1635 may communicate with any number of other servers, databases and/or components through any means known in the art. Further, application server 1635 may serve as a conduit between web client 1610 and the various systems and components of the Translink System 1655. Internet server 1620 may interface with application server 1635 through any means known in the art including a LAN/WAN, for example. Application server 1635 may further invoke ATPT utility 1645, data management server 1640, and/or report engine 1665 in response to user 1605 requests.

ATPT utility 1645 may include any hardware and/or software suitably configured to receive requests from web client 1610 via Internet server 1620 and application server 1635. ATPT utility 1645 is further configured to process requests, construct database queries, execute queries against account database 1650, as well as exchange data with card issuer system 1660 and client backend systems 1675 via middleware 1640. In one embodiment, ATPT utility 1645 may be configured to interact with other Translink System 1655 components to perform complex calculations, retrieve additional data, format data into reports, create XML representations of data, construct markup language documents, and/or the like. Moreover, ATPT utility 1645 may reside as a standalone system or may be incorporated with application server or any other Translink System 1655 component as program code.

Middleware 1640 may include any hardware and/or software suitably configured to facilitate communications and/or process transactions between disparate computing systems. Middleware components are commercially available and known in the art. Middleware 1640 may be implemented through commercially available hardware and/or software, through custom hardware and/or software components, or through a combination thereof. Middleware 1640 may reside in a variety of configurations and may exist as a standalone system or may be a software component residing within application server 1635. Middleware 1640 may be configured to process transactions between ATPT utility 1645 and other systems and components within Translink System 1655 and/or systems and components residing in card issuer systems 1660 and client backend systems 1675. In one embodiment, middleware 1640 may comprise web services that are invoked to exchange data between the various disclosed systems.

In order to control access to application server 1635 or any other component of Translink System 1655, Internet server 1620 may invoke an authentication server 1625 in response to user 1605 submissions of authentication credentials received at intranet server 1620. Authentication server 1625 may include any hardware and/or software suitably configured to receive authentication credentials, encrypt and decrypt credentials, authenticate credentials, and/or grant access rights according to pre-defined privileges attached to the credentials. Authentication server 1625 may grant varying degrees of application and data level access to users based on information stored within user database 1630. For example, a program manager may be granted access to request account numbers on behalf of an employee and enter descriptors, while the employee may be limited to view account numbers.

User database 1630 may include any hardware and/or software suitably configured to facilitate storing identification, authentication credentials, and/or user permissions. Account database 1650 stores data relating to account numbers, including descriptors, lock status, cancellation date, transaction limits, use parameters, and/or the like. One skilled in the art will appreciate that system 1600 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 1600, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 1600 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 1600 may consist of any combination thereof at a single location or at multiple locations, wherein each database or system includes any of various suitable security features, such as firewalls, access codes, encryption, decryption, compression, decompression, and/or the like.

The invention may be described herein in terms of functional block components, screen shots, optional selections and various processing steps. It should be appreciated that such functional blocks may be realized by any number of hardware and/or software components configured to perform the specified functions. For example, system 1600 may employ various integrated circuit components, e.g., memory elements, processing elements, logic elements, look-up tables, and/or the like, which may carry out a variety of functions under the control of one or more microprocessors or other control devices. Similarly, the software elements of system 90 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 90 may employ any number of conventional techniques for data transmission, signaling, data processing, network control, and/or the like. Still further, system 90 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

FIG. 17 to 21 are process flow embodiments describing the interaction between the various system components for the purposes disclosed herein and are not intended to limit the scope of the invention. For example, the steps recited in any of the method or process descriptions may be executed in any order and are not limited to the order presented. It will be appreciated that the following description makes appropriate references not only to the elements depicted in FIGS. 17 to 21, but also to the various system components as described above with reference to FIG. 16 and the account number table of FIG. 21.

As disclosed herein, system 1600 provides users the ability request single-use account numbers, assign descriptors, define cancellation dates, set transaction limits, assign use parameters, and/or the like. In one embodiment, user 1605 establishes a connection to Translink System 1655 via web client 1610 and is presented a Translink home page that includes any number of links to other web pages and web sites. The Translink home page is accessed, for example, through a link within the card issuer's official Internet web site. The Translink home page further includes fields and/or links to facilitate collection of authentication credentials via entry of a user identifier and password, smartcard interfaced with a reader, RF tag interfaced with an RF receiver, a biometric scan, or any other authentication means known in the art or later developed. The Translink home page includes a menu with links to web pages to enable user 1605 to request account numbers, configure account numbers, view account numbers including status, and/or request reports. Practitioners will appreciate that the arrangement and distribution of the functionality disclosed herein is presented for the purpose of explanation and example only and does not limit the scope of the invention.

After user 1605 has provided authentication credentials via any of the means described above, the credentials are transmitted to Internet server 1620. Intranet server 1620 invokes authentication server 1625, which processes the credentials and executes a query against user database 1630 to retrieve a record corresponding to the authentication credentials. If corresponding authentication credentials are not found, then a decline message is transmitted to web client 1610 via Internet server 1620. If corresponding authentication credentials are retrieved from user database 1630, then access privileges are determined and a session is started for user 1605.

The above is but one embodiment of an authentication system that may be employed to limit access to Translink System 1655. Practitioners will appreciate that system 1600 may implement any known methods for preventing access from unauthorized users such as requiring users to register and/or by assigning authentication credentials to individual users. However, system 1600 anticipates an authentication server 1625 which is employed to enforce security policies by allowing varying levels of access to users based on such policies. Internet security protocols including methods of authentication and user management are well known in the art, therefore system 1600 may employ any number of security architectures and authentication processes which will not be described a greater detail herein.

FIG. 16 is an exemplary process diagram for automatic reconciliation of card transactions, according to an embodiment of the present invention. After the establishment of a connection to Translink System 1655 via web client 1610, an interface is provided wherein user 1605 may request account numbers either singularly or in bulk. In one embodiment, the account number request interface provides fields to enable user 1605 to enter a transaction descriptor in addition to account number parameters governing the use and management of the account number. Practitioners will appreciate that these fields may take the form of free-form text entry fields, dropdown menus, option boxes, date selection popup, and/or the like. Moreover, system 1600 may be configured to make some fields required while defining others as optional. For example, entering a cancellation date may be optional, meaning that if the field is left blank, the account number will not be removed until it is used to facilitate a purchase transaction.

As previously mentioned, user 1605 may define account number parameters to associate with a requested account number. Such parameters may include, for example, a cancellation date, a transaction limit, and a use limit. If user 1605 enters a cancellation date, Translink system 1655 deletes the account number from account database 1650 after reaching the defined date if the account number has not been used. A transaction limit may be defined to ensure that a purchase made using the associated account number does not exceed a predetermined sum. For example, in requesting an account number for the purchase of a laptop computer, user 1605 may determine, according to company policy, that the purchases of laptop computers must not exceed $2,000. Thus, if the account number is used in an attempt to purchase a $2,100 laptop computer, the transaction would be declined, or the system may request that the employee provide personal funds or loyalty points. A use limit defines how the account number must be used. In another embodiment, the use limit may define a suggested use of the account number, or various options for use of an account number. The use limit may comprise a list of approved service establishments, wherein if the account number is used to attempt to facilitate a purchase transaction with a service establishment that is not listed, the transaction is declined.

Practitioners will appreciate that a use limit may further govern purchase transactions by manufacturer, service establishment location, industry, product type, service type, date, and/or the like. Moreover, the account number descriptor may also limit the use of the account number. For example, if user 1605 enters an "office supplies" descriptor, an attempted purchase of an airline ticket may be declined. The invention also contemplates that partial or complete use of the account number outside of the use limits may result in a decline, a partial decline, a request to use personal funds, a request to use another account, a request for additional authentication credentials, a decline based upon the cardholder status, a request to use loyalty points, a request to charge the transaction to another company or vendor and/or the like.

When user 1605 configures an account number request, he may select a link to add a second account number to the request or select a link to submit the request (step 1720) to the ATPT utility 1705 for processing. If user 1605 wishes to include more than one account number to the request, the above steps may be repeated any number of times until the desired number of account numbers have been configured and added to the request. In one embodiment, the account number request interface includes an upload link to enable user 1605 to upload a request file for a bulk account number request. The bulk request file may comprise any file format including, for example, a Microsoft Excel spreadsheet, Microsoft Word document, an Adobe PDF file, and/or the like. The file may contain a number of rows, each representing an account number, with columns for defining a descriptor, a cancellation date, a transaction limit, and a use limit. Thus, the bulk request file may be prepared in advance and uploaded to system 1600 by selecting an "Upload" link from the account number request interface, locating the file in a "File Open" dialog, selecting the bulk request file, and selecting an "Upload File" button. After the file has been uploaded to system 1600, user 1605 may select a link to submit the bulk request file (step 1720) to the ATPT utility 1705.

Whether the request is transmitted via a HTML stream containing one or more account numbers or as a bulk request file, the request is transmitted (step 1725) to IPM (Integrated Program Management) 1710 where it is formatted, verified, and processed. IPM 1710 is linked with an existing card issuance system via web services, for example, to generate account numbers in accordance with the request. Information accompanying the request may include user credentials, a corporate account identifier, and any other information that is required or desired for the processing of an account number request.

Practitioners will appreciate that the request may utilize an existing card issuer computing processes and architecture. For example, card issuers such as American Express have existing systems and processes in place for receiving a request to establish a transaction account and issue a unique account identifier that is used by the account holder and merchant to facilitate purchase transactions. As such, ATPT 1705 may format the request in the conventional manner. When the request is received by IPM 1710, it is processed just as any other account request would be processed, thereby requiring little or no modification to existing card issuer systems.

After IPM 1710 has processed the request, one or more assigned account numbers are transmitted (step 1730) to ATPT utility 1705. The account numbers are stored with their associated descriptor and parameters in account database 1650. Referring to FIG. 21, the diagram illustrates an exemplary database table for maintaining the single-use account numbers in accordance with an embodiment of the present invention. The table includes an account number column 2110 for maintaining the account numbers that were generated and transmitted to ATPT 1705 in step 1730. Each is a single-use account number that is locked after it is used for the intended purchase transaction as shown at 2120. Further, the table includes a descriptor column for storing the transaction descriptor as entered by user 1605 when creating the account number request.

Practitioners will appreciate that FIG. 21 is a very basic representation of a database table that may be used to maintain single-use account numbers and their associated descriptor. As previously stated, the table may include columns for a cancellation date, transaction limit, use limit, etc. Moreover, the table may include primary and secondary keys to associate all of the account numbers with user 1605, a corporate account identifier, a specific corporate card account number, and/or the like.

At any time following the receipt and storage of the requested one or more account numbers (step 1730), user 1605 may establish a connection to Translink System 1655 to retrieve one or more of the account numbers (step 1735). In one embodiment, ATPT utility 1645 executes a query against account database 1650 to locate the first available account number that is not locked. Referring to FIG. 21, when an unlocked account number is located, an indicator is added to the "locked" field 2120 indicating that the account number is in use, thereby preventing the duplicate use of the account number. The account number may be presented within an interface enabling user 1605 to note or print the account number. In another embodiment, one or more account numbers may be transmitted to user 1605 via email, facsimile, text message, or by any other means known in the art.

After retrieving the single-use account number, user 1605 may subsequently provide the account number to a service establishment to facilitate payment for a good or service. The service establishment may process the account number in the conventional manner through input to a point of sale device or by any other means. Moreover, because the account number represents a true transaction card number, standard settlement systems and processes may be employed via the card issuer 1660.

Following the end of each business day, or at any other predetermined interval, issuer 1715 transmits transactional data (step 1740) to ATPT 1705 for daily reconciliation. For each transaction being processed, ATPT utility 1645 executes a query against account database 1650 using the account number from the transactional data. Referring again to FIG. 21, after locating a record corresponding to the account number, the descriptor is retrieved from the descriptor field 2130 and a record is created in a reconciled transactions table that includes the account number of the corresponding descriptor. The record may further include the transaction date, transaction amount, service establishment identifier, location, and/or the like.

After reconciling a transaction account number with an account descriptor, ATPT 1705 transmits an account cancellation request (step 1745) to IPM 1710. Because each account number is for single-use, IPM 1710 is notified when the account number has been used so that it can be cancelled, thereby eliminating any possibility that the same account number will be used in a subsequent transaction. Other events may also trigger a cancellation of an account number such as, for example, reaching a defined account number cancellation date prior to the account number being used in a transaction, improper use of the account number and/or the like. Defining a cancellation date may prevent account database 1650 from accumulating a number of active, yet unused account numbers.

Figure 18:
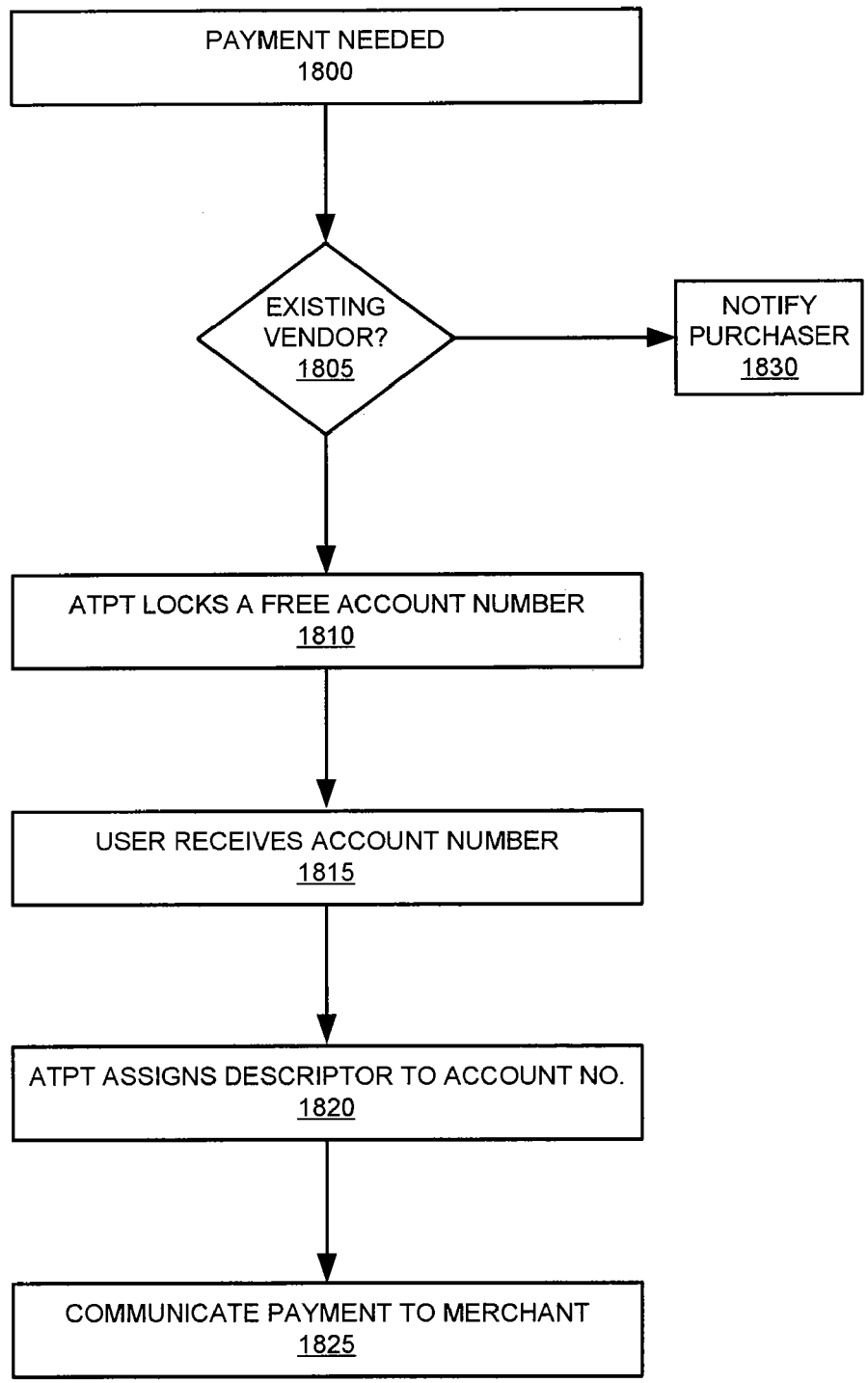
FIG. 18 is an exemplary process diagram for facilitating a purchase transaction through a single-use account code, according to an embodiment of the present invention.

FIG. 18 is an exemplary process diagram for facilitating a purchase transaction through a single-use account number in accordance with an embodiment of the present invention. When an account number is required for payment to a vendor (step 1800), determination is made whether the identified vendor is an existing vendor (step 1805). If the identified vendor is not authorized to accept the single-use account number for payment, then the purchaser is notified (step 1830) in order to determine whether to use an alternative payment method or select a different vendor. In response to a request to obtain an account number, ATPT utility 1645 issues a query to account database 1650 to retrieve the first account number that has not been locked, locks the retrieved account number (step 1810), and communicates the account number to the user (step 1815). ATPT utility 1645 queries a descriptor table to retrieve the assigned descriptor corresponding to the account number and add the descriptor to the account number record (step 1820) in account database 1660. User 1605 then communicates the account number to the service establishment (e.g., vendor) to facilitate a payment (step 1825). User 1605 may communicate the account code to a service establishment by way of at least one of verbal, telephone, facsimile, purchase order, email, sales contract, web page, and personal digital assistant.

Figure 19:
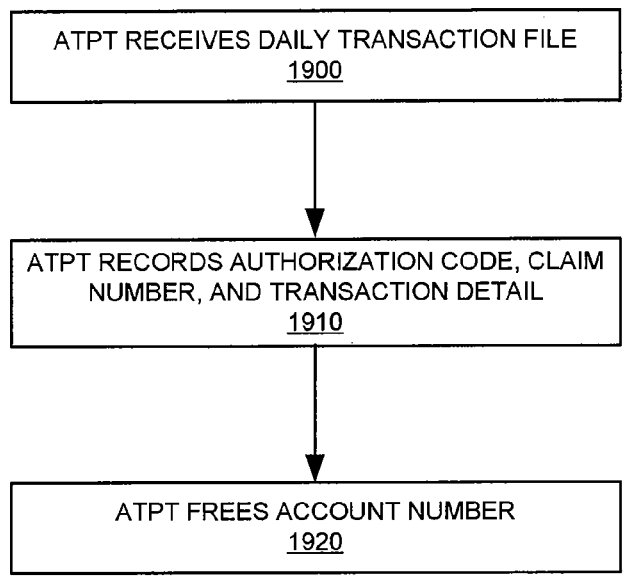
FIG. 19 is an exemplary process diagram for facilitating a daily reconciliation of card transactions, according to an embodiment of the present invention.

FIG. 19 is an exemplary process for facilitating a daily reconciliation of card transactions in accordance with an embodiment of the present invention. ATPT utility 1645 receives a daily transaction file (step 1900) from card issuer 1660. The daily transaction file contains details relating to any number of purchase transactions over a defined period of time (e.g., twenty-four hours). ATPT utility 1645 processes the file by extracting transaction details including an account number, querying account database to retrieve a record corresponding to the transaction account number, and/or creating a record in a reconciled transactions table recording the transaction authorization code, claim number, and/or other transaction details (step 1910). ATPT utility 1645 frees the reconciled account number (step 1920) by removing the account number from account database 1650 and transmitting an account number cancellation request to IPM. In one embodiment, the account number is not canceled and the lock is removed from account number record in account database 1650.

Figure 20:
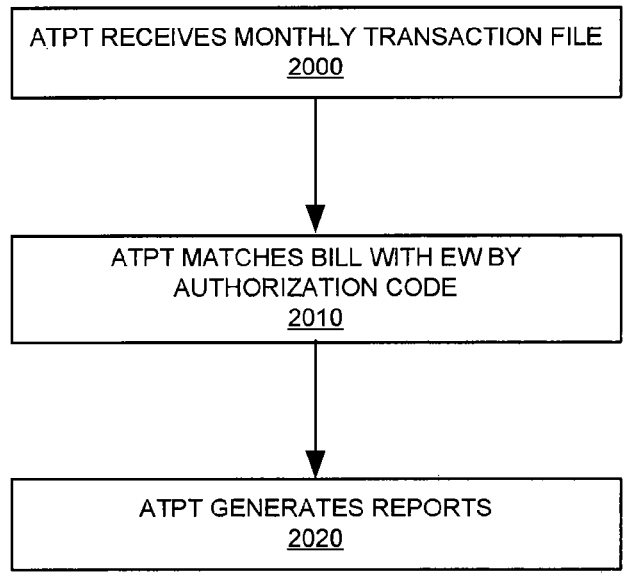
FIG. 20 is an exemplary process diagram for facilitating a monthly reconciliation of card transactions, according to an embodiment of the present invention; and, FIG. 21 is an exemplary database table for maintaining single-use account codes, according to an embodiment of the present invention.

FIG. 20 is an exemplary process for facilitating a monthly reconciliation of card transactions in accordance with an embodiment of the present invention. To provide holistic reporting for transactions performed both within and outside of Translink System 1655. ATPT utility 1645 receives a monthly transaction file (step 2000) from card issuer 1660. The monthly transaction file contains details relating to any number of conventional and single-use account purchase transactions over a previous month. ATPT utility 1645 matches individual bills with each corresponding record within the client's accounting system according to authorization code (step 2010) and compiles a report detailing an client's spend activity over the previous month (step 2020). In one embodiment, user 1605 may interact with ATPT utility 1645 to generate reports for other months as well. For example, user 1605 may select to view a reports summarizing the previous quarter on a month-by-month basis.

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

We claim:

1. A computer-implemented method, said method including:
    receiving, at a computer for reconciling transactions associated with a transaction account, an account code request from a client, wherein said account code request includes a transaction descriptor and a use constraint, wherein charges associated with a plurality of said different account codes are charged to said transaction account, and wherein said account code request is entered by a user at said client, wherein said transaction descriptor is a customized descriptor defined by said user, wherein said transaction descriptor is associated with at least one of a product category and a budget category, wherein said transaction descriptor is associated with an entry in an accounting system of said user, and wherein said use constraint is associated with at least one of a transaction amount limit, an expiration date, a product and a merchant;
    pre-reconciling said transactions by associating, at said computer, said transaction descriptor with said account code to create an account code record;
    communicating, by said computer, said account code to said client;
    receiving, at said computer, transaction details associated with said transactions from a transaction processor, wherein said transaction details include said account code;
    determining, by said computer, said transaction descriptor associated with said account code;
    comparing, by said computer, said transaction details with said transaction descriptor of said account code record to verify approval of said transactions;
    categorizing, by said computer and based on said transaction descriptor, said transactions into a user-defined grouping;
    reconciling, by said computer, said transactions to said accounting system based upon said transaction descriptor; and
    transforming, by said computer and based upon said reconciling and said user-defined grouping, a statement associated with said transaction account into a revised statement.

2. The method of claim 1, further including creating said revised statement including said grouping on a monthly basis.

3. The method of claim 2, wherein said account code request comprises a request for a secondary account code associated with said transaction account, a first subordinate secondary transaction number ("SSTN"), a second SSTN, a first transaction descriptor to associate with said secondary account code, a second transaction descriptor to associate with said first SSTN and a third transaction descriptor to associate with said second SSTN, wherein said categorizing said transactions into a grouping comprises categorizing said transactions into a plurality of groupings based at least partially upon said first transaction descriptor, said second transaction descriptor and said third transaction descriptor and wherein said revised statement reconciles said transactions into said plurality of groupings.

4. The method of claim 3, wherein said use constraint comprises at least one of a list of authorized service establishments, authorized locations, authorized product types, authorized manufacturers, authorized industry, and authorized transaction dates.

5. The method of claim 4, wherein said account code is a transaction card account code associated with at least one of said client and a corporate line of credit.

6. The method of claim 5, wherein said account code is communicated to a service establishment by way of at least one of verbal, telephone, facsimile, purchase order, email, sales contract, web page, and personal digital assistant.

7. The method of claim 6, wherein said transaction details further include at least one of a transaction amount, transaction time, service establishment identifier, and service establishment location.

8. The method of claim 7, wherein said revised statement further includes at least one of a transaction amount, transaction time, service establishment identifier, and service establishment location.

9. The method of claim 8, wherein said account code is restricted to a certain geographic area.

10. The method of claim 9, further comprising said account code causing a decline, a partial decline, a request to use personal funds, a request to use another account, a request for additional authentication credentials, a decline based upon a status of said transaction account, a request to use loyalty points, a request to charge at least a portion of said transaction to another company, and a request to charge at least a portion of said transaction to a vendor.

11. The method of claim 10, further comprising retrieving said account code from an account issuer.

12. The method of claim 11, further comprising retrieving, from an account issuer, a plurality of said account codes associated with said client.

13. The method of claim 12, further comprising reporting said revised statement to said client.

14. The method of claim 13, wherein said revised statement includes said transaction descriptor.

15. The method of claim 14, wherein said use constraint enables said account code to be used to facilitate a purchase transaction with a service establishment according to at least one of: manufacturer, industry, product type, and service type.

16. A non-transitory tangible computer-readable medium having stored thereon computer-executable instructions that, if executed by a computer for reconciling transactions associated with a transaction account, cause said computer to perform a operations comprising:
    receiving, by said computer, an account code request from a client, wherein said account code request includes a transaction descriptor and a use constraint, wherein charges associated with a plurality of said different account codes are charged to said transaction account, and wherein said account code request is entered by a user at said client, wherein said transaction descriptor is a customized descriptor defined by said user, wherein said transaction descriptor is associated with at least one of a product category and a budget category, wherein said transaction descriptor is associated with an entry in an accounting system of said user, and wherein said use constraint is associated with at least one of a transaction amount limit, an expiration date, a product and a merchant;
    pre-reconciling said transactions by associating, by said computer, said transaction descriptor with said account code to create an account code record;

communicating, by said computer, said account code to said client;

receiving, by said computer, transaction details associated with said transactions from a transaction processor, wherein said transaction details include said account code;

determining, by said computer, said transaction descriptor associated with said account code;

comparing, by said computer, said transaction details with said transaction descriptor of said account code record to verify approval of said transactions;

categorizing, by said computer and based on said transaction descriptor, said transactions into a user-defined grouping;

reconciling, by said computer, said transactions to said accounting system based upon said transaction descriptor; and transforming, by said computer and based upon said reconciling and said user-defined grouping, a statement associated with said transaction account into a revised statement.

17. A system for reconciling transactions associated with a transaction account comprising:

a network interface communicating with a non-transitory memory;

the memory communicating with a processor for reconciling transactions associated with a transaction account; and the processor, when executing a computer program, is configured to:

receive, by said processor, an account code request from a client, wherein said account code request includes a transaction descriptor and a use constraint, wherein charges associated with a plurality of said different account codes are charged to said transaction account, and wherein said account code request is entered by a user at said client, wherein said transaction descriptor is a customized descriptor defined by said user, wherein said transaction descriptor is associated with at least one of a product category and a budget category, wherein said transaction descriptor is associated with an entry in an accounting system of said user, and wherein said use constraint is associated with at least one of a transaction amount limit, an expiration date, a product and a merchant;

pre-reconciling, by said processor, said transactions by associating said transaction descriptor with said account code to create an account code record;

communicate, by said processor, said account code to said client;

receive, by said processor, transaction details associated with said transactions from a transaction processor, wherein said transaction details include said account code;

determine, by said processor, said transaction descriptor associated with said account code;

comparing, by said processor, said transaction details with said transaction descriptor of said account code record to verify approval of said transactions;

reconcile, by said processor, said transactions to said accounting system based upon said transaction descriptor; and transform, by said processor and based upon said reconciling and said user-defined grouping, a statement associated with said transaction account into a revised statement.

* * * * *